United States Patent
Anbil

(10) Patent No.: US 7,848,944 B1
(45) Date of Patent: Dec. 7, 2010

(54) TUNING A SCHEDULE OF TRANSPORTATION RESOURCES USING MATHEMATICAL PROGRAMMING

(75) Inventor: Ranga Anbil, Austin, TX (US)

(73) Assignee: Southwest Airlines Co, Dallas, TX (US)

( * ) Notice: Subject to any disclaimer, the term of this patent is extended or adjusted under 35 U.S.C. 154(b) by 0 days.

(21) Appl. No.: 12/796,531

(22) Filed: Jun. 8, 2010

Related U.S. Application Data

(63) Continuation of application No. 11/116,901, filed on Apr. 28, 2005, now Pat. No. 7,734,493.

(51) Int. Cl.
    *G06F 9/44* (2006.01)
(52) U.S. Cl. .......................................... 705/8
(58) Field of Classification Search ................. 705/8
    See application file for complete search history.

(56) References Cited

U.S. PATENT DOCUMENTS

| | | | |
|---|---|---|---|
| 5,228,115 | A | 7/1993 | Natarajan |
| 5,802,492 | A | 9/1998 | DeLorme et al. |
| 6,154,735 | A | 11/2000 | Crone |
| 7,006,903 | B2 * | 2/2006 | Smith et al. ............... 701/3 |
| 7,228,207 | B2 * | 6/2007 | Clarke et al. .............. 701/3 |
| 7,340,405 | B1 * | 3/2008 | Gunther et al. ............. 705/6 |
| 2003/0167110 | A1 | 9/2003 | Smith et al. |
| 2005/0137925 | A1 | 6/2005 | Lakritz et al. |

OTHER PUBLICATIONS

Lohatepanont, Manoj and Barnhart, Cynthia ("Airline Schedule Planning: Integrated Models and Algorithms for Schedule Design and Fleet Assignment," Transportation Science, vol. 38, No. 1, Feb. 2004, pp. 19-32, eissn 1526-5447.).*

Rexing, B., C. Barnhart, T. Kniker, A. Jarrah. ("Airline Fleet Assignment with Time Windows," Transportation Science, vol. 34, No. 1, Feb. 2000, pp. 1-20, eissn 1526-5447).*

Barnhart, C., T. Kniker, M. Lohatepanont ("Itinerary-based Airline Fleet Assignment," Transportation Science, vol. 36, No. 2, May 2002, pp. 199-217, eissn 1526-5447).*

Dr. Roman Bartak, Constraint Programming: In Pursuit of the Holy Grail, Charles University, Czech Republic, Jun. 1999, pp. 1-10.

Dr. Roman Bartak, Foundations of Constraint Programming, A tutorial on ETAPS2003, http://kto,ms.mff.cuni.cz/~bartak/ETAPS2003/index/html, Apr. 12, 2003, Warshaw, Poland, p. 1.

Dr. Roman Bartak, Constraint Guide—Introduction, http://kti.ms.mff.cuni.cz/~bartak/constraints/intro.html, © 1998, pp. 1-3.

(Continued)

*Primary Examiner*—Romain Jeanty
*Assistant Examiner*—George H Walker
(74) *Attorney, Agent, or Firm*—Fish & Richardson P.C.

(57) ABSTRACT

Techniques for refining a schedule involve identifying schedule alternatives to an original schedule and generating one or more substitute schedules using one or more of the schedule alternatives. An objective function is used to perform an analysis of the original schedule and the one or more substitute schedules, and a refined schedule is selected based on the analysis.

18 Claims, 11 Drawing Sheets

OTHER PUBLICATIONS

Dr. Roman Bartak, Constraint Guide—Constraint Satisfaction, http://kti.ms.mff.cuni.cz/~bartak/constraints/constrsat/html, © 1998, pp. 1-3.

Dr. Roman Bartak, Constraint Guide—Binarization, http:/kti.ms.mff.cuni.cz/~bartak/constraints/binary.html, © 1998, pp. 1-4.

Dr. Roman Bartak, Constraint Guide—Systematic Search, http://kti.ms.mff.cuni.cz/~bartak/constraints/backtrack.html, © 1998, pp. 1-3.

Dr. Roman Bartak, Constraint Guide—Consistency Techniques, http://kti.ms.mff.cuni.cz/~bartak/constraints/consistent.html, © 1998, pp. 1-6.

Dr. Roman Bartak, Constraint Guide—Constraint Propagation, http://kti.ms.mff.cuni.cz/~bartak/constraints/propagation.html, © 1998, pp. 1-5.

Dr. Roman Bartak, Constraint Guide—Value and Variable Ordering, http://kti.ms.mff.cuni.cz/~bartak/constraints/ordering.html, © 1998, pp. 1-3.

Dr. Roman Bartak, Constraint Guide—Reducing Search, http://kti.ms.mff.cuni.cz/~bartak/constraints/nosearch.html, © 1998, pp. 1-3.

Dr. Roman Bartak, Constraint Guide—Stochastic Algorithms, http://kti.ms.mff.cuni.cz/~bartak/constraints/stochastic.html, © 1998, pp. 1-4.

Dr. Roman Bartak, Constraint Guide—Benchmarking, http://kti.ms.mff.cuni.cz/~bartak/constraints/benchmark.html, © 1998, pp. 1-5.

Dr. Roman Bartak, Constraint Guide—Over-Constrained Problems, http://kti.ms.mff.cuni.cz/~bartak/constraints/over_constr.html, © 1998, pp. 1-2.

Dr. Roman Bartak, Constraint Guide—Extending CSP, http://kti.ms.mff.cuni.cz/~bartak/constraints/extend_csp.html, © 1998, pp. 1-3.

Dr. Roman Bartak, Constraint Guide—Partial CSP, http://kti.ms.mff.cuni.cz/~bartak/constraints/pcsp.html, © 1998, pp. 1-3.

Dr. Roman Bartak, Constraint Guide—Constraint Hierarchies, http://kti.ms.mff.cuni.cz/~bartak/constraints/hierarchies.html, © 1998, pp. 1-6.

Dr. Roman Bartak, Constraint Guide—Constraint Hierarchy Solvers, http://kti.ms.mff.cuni.cz/~bartak/constraints/ch_solvers.html, © 1998, pp. 1-10.

Dr. Roman Bartak, Constraint Guide—Alternative/General Approaches, http://kti.ms.mff.cuni.cz/~bartak/constraints/general.html, © 1998, pp. 1-4.

Dr. Roman Bartak, Constraint Guide—Modeling, http://kti.ms.mff.cuni.cz/~bartak/constraints/modeling.html, © 1998, pp. 1-4.

Dr. Roman Bartak, Constraint Guide—FAQs, http://kti.ms.mff.cuni.cz/~bartak/constraints/FAQs.html, © 1998, pp. 1-2.

Dr. Roman Bartak, Constraint Guide—Systems, http://kti.ms.mff.cuni.cz/~bartak/constraints/systems.html, © 1998, pp. 1-5.

Dr. Roman Bartak, Constraint Guide—Additions and Corrections, http://kti.ms.mff.cuni.cz/~bartak/constraints/addendum.html, © 1998, pp. 1-3.

Sabre, Sabre Flight Scheduling Products, Airline Profitability Model (APM), Aug. 2000, pp. 1-3.

Sabre, Sabre Flight Scheduling Products, Fleet Assignment Model (FAM), Aug. 2000, pp. 1-3.

Sabre, Sabre Flight Scheduling Products, Aircraft Routing Model (ARM), Aug. 2000, pp. 1-3.

Sabre, Sabre Flight Scheduling Products, Through Assignment Model (TAM), Aug. 2000, pp. 1-3.

Sabre, Sabre Flight Scheduling Products, Dependability Predictor Model (DPM), Aug. 2000, pp. 1-3.

Sabre, Sabre Flight Scheduling Products, Southwest Airlines—A Symbol of Freedom, Aug. 8, 2000, pp. 1-12.

Sabre, Sabre Flight Scheduling Products, AirFlite Flight Scheduling System, Aug. 2000, pp. 1-30.

Spyros Kontogiorgis and Suresh Acharya, US Airways Automates Its Weekend Fleet Assignment, Interfaces 29:3, May-Jun. 1999, pp. 52-62.

Bill Lester, Southwest Airlines, Natural Selection, Inc., Multi-Tasking System for Nonlinear Schedule Optimization, Nov. 12, 1999, pp. 1-20.

CPoint, Connect Point International, SET2000, ISET2000, www.cpoint2000.com, pp. 1-2.

Southwest Airlines, Schedule Planning, Complexity Science Overview, Apr. 1998, pp. 1-21.

The Preston Group, TAAM—Fast-Time Simulation for Southwest Airlines, pp. 1-9.

The Preston Group, AADS—Aircraft Activity Display System, pp. 1-8.

The Preston Group, Consulting Services—Project-Based Solutions for the Global Aviation Industry, pp. 1-6.

The Preston Group, PAXSIM—Passenger Simulation System, pp. 1-8.

The Preston Group, SPAR—Staff Planning, Allocation & Rostering, pp. 1-8.

The Preston Group, TAAM—Fast Time Gate-to-Gate Simulation, pp. 1-8.

The Preston Group, TMS—Terminal Management System, pp. 1-12.

Pete Welland, Delta Tests New Pushback Plans, .servicemodel, p. 1.

Srikumar S. Rao, Evolution at Warp Speed, Technology—Computers/Communications, Forbes, Jan. 12, 1998, pp. 82-83.

The Preston Group, TAAM—Airspace Simulation for the $21^{st}$ Century, pp. 1-13.

Kevin Kollman, Kapri Kupper, James Wetherly, and Michael Wambsganss, Collaborative Decision Making in Aviation Transportation, Oct. 1997, pp. 1-8.

International Business Machines Corporation, Supply Chain Optimization Practice, Copyright 1997, pp. 1-2.

International Business Machines Corporation, IBM Trim Optimization, Copyright 1996, pp. 1-2.

International Business Machines Corporation, A Family of Forest Products Scheduling Solutions, Copyright 1996, pp. 1-2.

International Business Machines Corporation, Optimization Solutions and Library Version 2.0, Copyright 1997, pp. 1-2.

International Business Machines Corporation, Supply Chain Simulation Services, Copyright 1997, pp. 1-2.

Thomas Hoffman, AI-Based Software Models Help Cut Production Costs, Reprinted from The Newspaper of Information Systems Management, Computerworld, Sep. 2, 1996, p. 1.

Gerald Feigin, Chae An, Daniel Conners, and Ian Crawford, Shape UP, Ship Out, ORMS Today, pp. 1-6.

Patrick Bitauld, Ken Burch, Soad El-Taji, Elena Fanucchi, Mario Montevecchi, Jim Ohlsson, Anthony Palella, Russ Rushmeier, and Jane Snowdon, Journey Management, ORMS Today, Oct. 1997, pp. 1-6.

Russell A. Rushmeier and Spyridon A. Kontogiorgis, Advances in the Optimization of Airline Fleet Assignment, Transportation Science, vol. 31, No. 2, May 1997, pp. 159-169.

J E Beasley, OR-Notes, Introduction to OR, http://mscmga.ms.ic.ac.uk/jeb/or/intro.html, Feb. 26, 1999, pp. 1-7.

J E Beasley, OR-Notes, Basic OR Concepts, http://mscmga.ms.ic.ac.uk/jeb/or/basicor.html, Feb. 26, 1999, pp. 1-10.

J E Beasley, OR-Notes, Linear Programming—Formulation, http://mscmga.ms.ic.ac.uk/jeb/or/lp.html, Mar. 3, 1999, pp. 1-15.

J E Beasley, OR-Notes, Linear Programming Tutorial Solution, http://mscmga.ms.ic.ac.uk/jeb/or/class2a.html, Mar. 3, 1999, pp. 1-2.

J E Beasley, OR-Notes, Integer Programming, http://mscmga.ms.ic.ac.uk/jeb/or/ip.html, Mar. 3, 1999, pp. 1-20.

J E Beasley, OR-Notes, Integer Programming Tutorial Question, http://mscmga.ms.ic.ac.uk/jeb/or/class8q.html, Mar. 3, 1999, pp. 1-2.

J E Beasley, OR-Notes, Integer Programming Tutorial Solution, http://mscmga.ms.ic.ac.uk/jeb/or/class8a.html, Mar. 3, 1999, pp. 1-3.

J E Beasley, OR-Notes, Graph Theory, http://mscmga.ms.ic.ac.uk/jeb/or/graph.html, Mar. 3, 1999, pp. 1-18.

J E Beasley, OR-Notes, Network Flow, http://mscmga.ms.ic.ac.uk/jeb/or/netflow.html, Mar. 3, 1999, pp. 1-12.

Robert Fourer, Software Survey: Linear Programming, ORMS Today, Apr. 1997, pp. 54-63.

The Department of Computational and Applied Mathematics at Rice University, What is Mathematical Programming?, http://www.caam.rice.edu/~mathprog/info/, Feb. 12, 1999, p. 1.

International Business Machines Corporation, The IBM Optimization Subroutine Library (OSL), http://www.research.ibm.com/osl/, Feb. 12, 1999, p. 1.

Argonne National Laboratory, Mathematics and Computer Science Division, What is Optimization?, http://www.mcs.anl.gov/home/otc/Guide/OptWeb/opt.html, Feb. 12, 1999, pp. 1-2.

Dennis F. X. Mathaisel, Decision Support for Airline Schedule Planning, Journal of Combinatorial Optimization I, Copyright 1997, pp. 251-275.

Ranga Anbil, John J. Forrest, and William R. Pulleyblank, Column Generation and the Airline Crew Pairing Problem, Documenta Mathematica—Extra Volume ICM, 1998, pp. 500-509.

SOURCE Connect Point International, Inc., News Release, http://www.cpoint2000.com, p. 1.

Percy P.C. Yip and Yoh-Han Pao, "Combinatorial Optimization with Use of Guided Evolutionary Simulated Annealing", IEEE 1045-9227/95, pp. 290-295.

David Sinclar, "The Airline Crew Rostering Problem", Dublin City University, 2000, 33 pages.

M. Nusbaum et al., "An Architecture for Solving Sequencing and Resource Allocation Problems using Approximation Methods", Journal of Operational Research Society, Jan. 1998, pp. 52-65.

Erik Kilborn, "Aircraft Scheduling and Operation—a Constraint Programming Approach", Chalmers University of Technology and Göteborg, University, Dec. 2000, 98 pages.

Mattias Grönkvist, "Accelerating Column Generation for Aircraft Scheduling Using Constraint Propagation", Computers & Operations Research 33, Feb. 4, 2005, pp. 2918-2934.

Becker, M., Advanced Tools for Airlift and Tanker Mission Scheduling, Access from: http://www.cs.cmu.edu/~ozone/barrel.html or http://web.archive.org/web20010508095538/http://www.cs.cmu/edu/~ozone/barrel/barrel.html (hereinafter, Becker Website).

Kramer, L.A., et al., Optimizing for Change: Mixed-Initiative Resource Allocation with the AMC Barrel Allocator, (Oct. 2002.), Prodeedings of the $3^{rd}$ International NASA Workshop on Planning and Scheduling for Space.

Becker, Marcel and Smith, Stephen, Mixed-Initiative Resource Management: The AMC Barrell Allocator, (Apr. 2000) Proceedings $5^{th}$ International Conference on AI Planning and Scheduling.

"A Global Approach to Crew-Pairing Optimization" (Anbil, Ranga et al, IBM Systems Journal. vol. 31, Iss. 1; p. 71-78, 1992).

"Decision Support for Airline System Operations Control and Irregular Operations" (Mathaisel, Dennis F. X. Computer Operations Research vol. 23, No. 11, pp. 1083-1098, 1996).

Barnhart et al. ("Airline Schedule Design," undated but included in the IDS submitted on Dec. 11, 2000 with U.S. Appl. No. 09/658,866, now US 7,340,405).

Cynthia Barnhart and Amy Cohn ("Airline Schedule Planning: Accomplishments and Opportunities," Manufacturing and Service Operations Management, vol. 6, No. 1, Winter 2004, eissn 1526-5498).

Manjo Lohatepanont and Cynthia Barnhart ("Airline Schedule Planning: Integrated Models and Algorithms for Schedule Design and Fleet Assignment," Transportation Science, vol. 38, No. 1, Feb. 2004, pp. 19-32 eissn 1526-5447).

Mirela Stojkovi and Franciois Soumis ("An Optimization Model for the Simultaneous Operational Flight and Pilot Scheduling Problem," Management Science, vol. 47, No. 9, Sep. 2001 pp. 1290-1305, eissn 1526-5501).

Rexing, B., C. Barnhart, Kniker, A. Jarrah, ("Airline Fleet Assignment with Time Windows," Transportation Science, vol. 34, No. 1, Feb. 2000, pp. 1-20. eissn 1526-5447).

Barnhart, C., T. Kniker, M. Lohatepanont ("Itinerary-based Airline Fleet Assignment," Transportation Science, vol. 36, No. 2, May 2002, pp. 199-217, eissn 1526-5447.

* cited by examiner

DAL-AUS

|  | 310(1) 6:00-8:00 | 310(2) 8:00-10:00 | 310(3) 10:00-13:00 | 310(4) 13:00-16:00 | 310(5) 16:00-18:00 | 310(6) 18:00-20:00 | 310(7) 20:00-22:00 |
|---|---|---|---|---|---|---|---|
| AUS-HOU | | | | | | | |
| 405(1) 6:00-7:30 | X | | | | | | |
| 405(2) 7:30-9:00 | X | | | | | | |
| 405(3) 9:00-11:00 | X | X | | | | | |
| 11:00-14:00 | | X | X | | | | |
| 14:00-17:00 | | | X | X | | | |
| 17:00-18:30 | | | | X | X | | |
| 18:30-21:00 | | | | | X | X | |
| AUS-ELP | | | | | | | |
| 6:00-10:00 | X | | | | | | |
| 10:00-13:00 | | X | X | | | | |
| 13:00-16:30 | | | X | X | | | |
| 16:30-21:00 | | | | X | X | X | |
| AUS-LAS | | | | | | | |
| 6:00-10:30 | X | X | | | | | |
| 10:30-15:30 | | X | X | X | | | |
| 15:30-22:00 | | | | X | X | X | X |

TUNING A SCHEDULE OF TRANSPORTATION RESOURCES USING MATHEMATICAL PROGRAMMING

CROSS REFERENCE TO RELATED APPLICATION

This application is a continuation of, and therefore claims priority to, U.S. patent application Ser. No. 11/116,901 filed on Apr. 28, 2005, now U.S. Pat. No. 7,734,493.

TECHNICAL FIELD

This description relates to schedule and route planning, and more particularly to using mathematical programming to develop a schedule that results in an improved allocation of transportation resources.

BACKGROUND

Commercial airlines typically have significant numbers of aircraft and serve dozens, if not more, of geographically diverse markets. Day-to-day operations require coordination of a variety of different business functions, including crew scheduling, maintenance, equipment scheduling, purchasing, and the like. Because many of the different business functions are interdependent, changes to one aspect of the operations can have an effect on other parts of the overall business. The logistics behind coordinating operations is further complicated by the geographic distribution of markets.

Generally, most of the operations of a commercial airline are centered around flight schedules. As with the coordination of day-to-day operations, the design of the overall flight schedule for a commercial airline involves complex interactions of numerous factors. Schedule design must take into account consumer demand, the ability to make connecting flights, maintenance requirements, gate availability, flight times and distances, airport restrictions and curfews, the number of available aircraft, and the like. Because of these various factors and the need to coordinate other business functions with the overall flight schedule, changes to a schedule design are generally performed weeks or even months in advance of implementing a change. The need for such advance planning limits the flexibility of commercial airlines in adapting to an evolving business environment, increasing efficiency, or otherwise modifying the overall flight schedule.

SUMMARY

Generating a schedule that meets demand and tends to maximize efficiency can help avoid the need to make wholesale changes on a frequent basis. In addition, mathematical programming techniques can be implemented to help refine new or existing schedules in a more rapid and efficient manner. For example, mathematical programming can be used to refine an existing or proposed schedule to ensure that the schedule satisfies constraints, meets demand efficiently, provides desired benefits, and/or minimizes undesired features.

In one general aspect, multiple schedule alternatives are identified based on an original schedule. One or more substitute schedules are generated using one or more of the schedule alternatives. An objective function performs an analysis of the original schedule and the one or more substitute schedules, and a refined schedule is selected based on the analysis.

Implementations can include one or more of the following features. The schedule alternatives are identified by identifying possible variations of instances in the original schedule. Each possible variation of an instance includes a time and/or a sequential connection between segments of a route that differs from a time or a sequential connection associated with the instance. The time and/or the sequential connection for the possible variation are associated with at least one particular segment of the route. Each instance in the original schedule includes a segment of a route, and each instance corresponds to a departure lime, an arrival time, or a sequential connection with another segment of the route. Each possible variation of an instance includes a different departure time within a particular deviation from the departure time of the instance, a different arrival time within a particular deviation from the arrival time of the instance, and/or a sequential connection with a segment from a different route of the original schedule.

Each schedule alternative includes a possible variation of at least one instance in the original schedule. Each substitute schedule includes portions of the original schedule and a set of schedule alternatives. The original schedule and each substitute schedule include service for a predetermined set of segments. One or more segments in each substitute schedule includes a different associated sequential connection than a sequential connection associated with the one or more segments in the original schedule. An objective function performs an analysis of the original schedule and the one or more substitute schedules by calculating a score associated with the original schedule and with each substitute schedule based on values relating to schedule characteristics. The values relating to schedule characteristics relate to an estimated ability to meet demand, estimated revenues, estimated costs, and/or and estimated resource utilization. The scores associated with the original schedule and the substitute schedules are compared, and a refined schedule is selected based on the analysis by selecting the original schedule or one of the substitute schedules as the refined schedule based on comparing the scores.

In another general aspect, a refined schedule is generated by identifying an original schedule that includes routes to be traveled by transportation resources and generating alternative schedules by modifying one or more features of the original schedule. The alternative schedules include routes to be traveled by the transportation resources. A comparison of the original schedule and the alternative schedules is performed using an objective function that quantifies a desirability of at least one schedule characteristic. A refined schedule is selected from the original schedule and the alternative schedules based on the comparison.

Implementations can include one or more of the following features. Each route in the original schedule includes an associated sequence of segments, and each segment has one or more associated times. One or more features of the original schedule are modified by creating possible routes by changing a time associated with a segment or exchanging segments between at least two routes. The alternative schedules are generated by selecting a sample of the routes in the original schedule, identifying alternative times for segments from each of the routes in the sample, and identifying alternative sequences of segments using segments from at least some of the routes in the sample. The alternative times include times within a predetermined deviation from a corresponding time in the original schedule. A sample of the routes in the original schedule are selected using a selection function to select routes having a relatively higher probability that modifications will produce a schedule that compares favorably to the original schedule, as measured by the objective function. A sample of the routes is selected by iteratively selecting routes using the selection function.

Each alternative schedule includes a combination of routes selected from the routes in the original schedule and the possible routes. A comparison of the original schedule and the alternative schedules is performed using the objective function to calculate a route score for each route and calculating a composite score for each alternative schedule by combining the scores of the routes for the alternative schedule. The composite score for each alternative schedule further includes accounting for one or more values that reflect a desirability of the combination of two or more of the routes in the alternative schedule. The refined schedule is a schedule that has a composite score indicating an increased desirability relative to the other schedules.

The details of one or more implementations are set forth in the accompanying drawings and the description below. Other features will be apparent from the description and drawings, and from the claims.

DESCRIPTION OF DRAWINGS

FIG. 4 is a chart of representative potential hook-ups corresponding to the departure windows of FIG. 3.

Like reference symbols in the various drawings indicate like elements.

DETAILED DESCRIPTION

Scheduling a network of transportation resources can involve techniques for simultaneously generating a schedule design, allocating an equipment fleet, and assigning routes. Initially, a proposed schedule is automatically generated based on specified parameters and constraints using constraint programming. The proposed schedule is then improved by iteratively modifying the schedule in accordance with a mathematical function to better match the schedule to existing demand.

The techniques can be used to generate an airline flight schedule, to allocate equipment (e.g., individual aircraft or aircraft types), and to assign routes. In general, a flight schedule encompasses departure and arrival times (i.e., instances) and the corresponding flight durations for specific flights between particular airports. Allocation of equipment involves assigning types of aircraft (and/or specific aircraft) to particular flights in the flight schedule. Assigning a route involves determining a sequence of flights to be handled by a single aircraft.

Although this description focuses on particular implementations of the invention in the context of aircraft, the invention can also be used for other types of transportation resources. For example, the techniques can be used to generate bus or train schedules. In addition, transportation resources are not necessarily limited to equipment used for transporting people but can also include, for example, equipment for transporting cargo or any set of objects or devices that travel between multiple locations in some coordinated manner. For example, the transportation resources can include a set of containers that are each routed through different sequences of locations.

Figure 1:
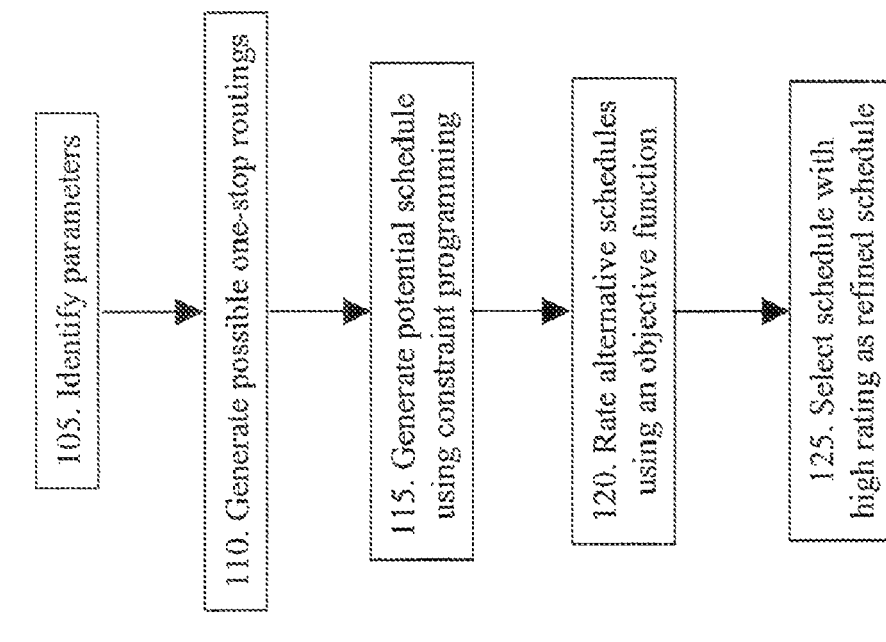
FIG. 1 is a flow diagram of a process for generating an optimized schedule in a network of transportation resources.

FIG. 1 is a flow diagram of a process 100 for generating an optimized schedule in a network of transportation resources. Initially, parameters for the schedule are identified (step 105). The parameters include the number of transportation resources (e.g., a number of aircraft), stations or endpoints (e.g., airports) for segments to be traveled by the transportation resources, and basic demand parameters (e.g., a number of flights to be scheduled between each pair of airports). The parameters also include constraints relating to the transportation resources, routing and allocation thereof, and schedule design. In general, the constraints define rules and preferences based on which a schedule is generated. For example, the constraints can define the number of transportation resources by type, station data (e.g., gates, curfews, market size), travel times between each station pair, and turnaround times for each station (i.e., allowed lengths of stopovers at each station).

Using the identified parameters, a set of possible hook-ups is generated (step 110). In general, hook-ups correspond to potential links between a first segment associated with a transportation resource and a second segment associated with the same transportation resource. Thus, the first segment ends at the same location that the second segment begins. In the context of an airline implementation, a "hook-up" is a link between a first market pair and a second market pair in which both market pairs are served by the same aircraft and where the first market pair includes an arrival station that is the departure station for the second market pair. For example, a potential hook-up might exist between a "Dallas-Austin" market pair with an arrival window between 8:00 a.m. and 10:00 a.m. and an "Austin-Houston" market pair with a departure window between 8:30 a.m. and 11:00 a.m. In general, a hook-up corresponds to a one-stop routing except that a one-stop routing may imply, for example, that passengers or cargo can continue through the stopover, while a hook-up can include situations where continuations are not allowed (e.g., passengers may not book a flight continuation). For purposes of this description, hook-ups include both situations where continuations are and are not allowed, while "one-stop routings" and "through-routings" are limited to situations where continuations are allowed. The set of possible hook-ups can include all possible hook-ups or can be limited according to a rule set, a random or arbitrary selection, or a manual operation.

Based on the set of possible hook-ups and the constraints, a potential schedule is generated using constraint programming (step 115). Constraint programming involves techniques for solving a problem using constraints that should be satisfied by the solution. Constraints, in the context of constraint programming, are logical relationships among multiple variables that restrict the possible values the variables can take and provide partial information about the variables. A problem to be solved using constraint programming generally involves a set of variables, each of which is mapped to a finite domain of possible values, and a set of constraints. Each constraint provides some restriction on the combination of values that the set of variables can take simultaneously. Constraint programming generates one or more solutions to the problem by assigning to each variable one or more values from the corresponding domain of possible values. The values are assigned through a search and are selected such that the constraints are satisfied.

In generating a potential schedule using constraint programming, the variables include the hook-ups and departure and/or arrival times for each routing segment (typically, it is not necessary to consider departure and arrival times as independent variables because they are interrelated by known or approximate travel times). The constraints place restrictions on which combinations of hook-ups can be used and on the departure and/or arrival times. Thus, each of the one or more solutions includes a particular combination of hook-ups and a departure and/or arrival time for each routing segment. In some cases, more than one potential schedule can be generated if, for example, more than one departure time for a particular routing segment provides an acceptable solution. Other variables include which transportation resources are assigned to which hook-ups and which stations are used as starting and ending points for each overall routing sequence. Typically, an overall routing sequence includes multiple segments and corresponds to a period over which a schedule repeats (e.g., a day).

A variety of techniques can be used individually or in combination to generate a potential schedule through constraint programming. Among other things, constraint programming aims to generate a solution through consistency testing. Consistency testing includes determining if every possible value of a variable within the corresponding domain satisfies the relevant constraints. If not, each value that is inconsistent with the relevant constraints is eliminated from the domain. Consistency testing also includes determining consistency between related variables. For example, if x and y are variables that are related by operation of one or more constraints, then for each possible value of variable x, there should be a possible value of y that satisfies the relevant constraints. Consistency testing may also involve determining consistencies among more than two variables. Through the use of consistency testing, possible values of variables can be eliminated or "whittled down." For example, constraint propagation techniques can be used to determine whether and how an elimination of one possible value of a variable propagates through constraints to eliminate possible values of other variables.

Constraint propagation techniques can include backtracking, forward checking, and look ahead techniques. Backtracking involves progressively assigning tentative values to variables until an inconsistency is encountered, then backtracking to a variable causing a conflict, and assigning a different value to that variable. In other words, when an assignment of a tentative value results in an inconsistency, the assignments are rolled back until a variable with a different possibly valid value is reached. Forward checking involves assigning a value to a current variable and removing possible values of other variables that conflict with the currently assigned value. Forward checking identifies invalid value assignments earlier than backtracking. Forward checking can also be used to eliminate possible values from a domain (i.e., still leaving multiple possible values), rather than to assign a single specific value to a variable. Look ahead techniques take constraint propagation one step further (in terms of speed of propagation and complexity of processing) and involve identifying conflicts among variables having as yet unassigned values (rather than between a variable with a currently assigned value and possible values of other variables, as in forward checking). Typically, different constraint propagation techniques are interchangeable depending on the desired distribution between efficiency and processing complexity. For example, forward checking is less efficient but also less complex than look ahead techniques.

Generating a potential schedule using constraint programming can also involve algorithms for determining the order in which variables are to be assigned values (e.g., to organizing variables into a hierarchy) and/or for determining the order in which values are assigned to one or more variables (e.g., organizing values into a hierarchy). This ordering can be static (i.e., predefined) or dynamic (i.e., potentially changing depending on the current state of the search for a solution). As with other techniques used in the constraint programming phase of the process 100, in some cases, such as when constraint programming is used to simultaneously identify multiple possible solutions or to identify an at least partially optimized solution, ordering of variables and values can be used to determine an order in which possible values should be eliminated from domains rather than an order in which single specific values are assigned to variables. Orderings of variables and values can also be used to improve the efficiency of the search (e.g., by ensuring a quicker or more reliable constraint propagation) and/or to influence the results of the search. A randomizing algorithm can also be applied to orderings of variables and values to potentially produce different results if a solution or solutions are generated in series or parallel.

In some cases, a set of constraints may be such that, if strictly applied, no solution exists. One way to help avoid a situation in which a set of constraints preclude finding a solution is to organize constraints in a hierarchy. For example, a constraint hierarchy may define an order of importance for constraints. Some constraints can be mandatory (i.e., rules), while other constraints can be optional (i.e., preferences). A solution can satisfy the overall set of constraints without strictly complying with all of the constraints. Instead, a solution can satisfy the constraints by, for example, complying with the mandatory constraints and complying with some (e.g., as many as possible) but not all of the optional constraints. Optional constraints can be further organized into a hierarchy, in which case constraint programming can be used to favor a solution that satisfies a high priority optional constraint over a solution that satisfies a lower priority optional constraint without satisfying the high priority optional constraint. Similarly, a partial solution can be generated using an initial set of constraints, and a second, more complete solution can be generated by adding one or more additional constraints (e.g., a high priority constraint, such as total plane count) and relaxing other constraints from the initial set of constraints (e.g., lower priority constraints, such as market spacing constraints). In some implementations, an order of importance for constraints can be implicitly defined through an order in which variables are considered.

The potential schedule generated using constraint programming is used as a "seed" schedule for a linear or mathematical programming algorithm that produces a refined schedule. In particular, linear programming is used to identify a refined schedule that produces a relatively increased value of an objective function. Accordingly, various schedule alternatives are scored or rated using an objective function (step 120). In general, the objective function is designed to provide some measure of efficiency, such as efficiency of meeting demand, producing revenue at relatively low cost, reducing costs, and/or resource utilization. In some cases, the seed schedule can include variables that include multiple values. In other words, the constraint programming processing can produce a schedule with numerous alternative hook-ups and numerous alternative departure and/or arrival times. As a result, the seed schedule can represent a universe of possibilities from which a final schedule can be produced. Alternatively, the seed schedule can be used to produce multiple possible schedule alternatives (e.g., by expanding departure times and identifying alternative hook-ups using the seed schedule).

Using the scored schedule alternatives, scores for each possible overall schedule are combined to produce an overall score. A schedule that produces a relatively high overall score is identified as the refined schedule (step 125). A relatively higher score represents a set of schedule alternatives that tends to increase the presence of features considered to be beneficial by the objective function and/or to decrease the presence of features considered to be unfavorable by the objective function. In some cases, the refined schedule corresponds to the highest overall score. In other cases, the refined schedule corresponds to an overall score that is less than the maximum score (e.g., if the schedule with the maximum score violates a mandatory constraint). In some implementations, the schedule generated by the constraint programming processing and/or the refined schedule can be manually adjusted to produce a seed schedule or final schedule, respectively.

Figure 2:
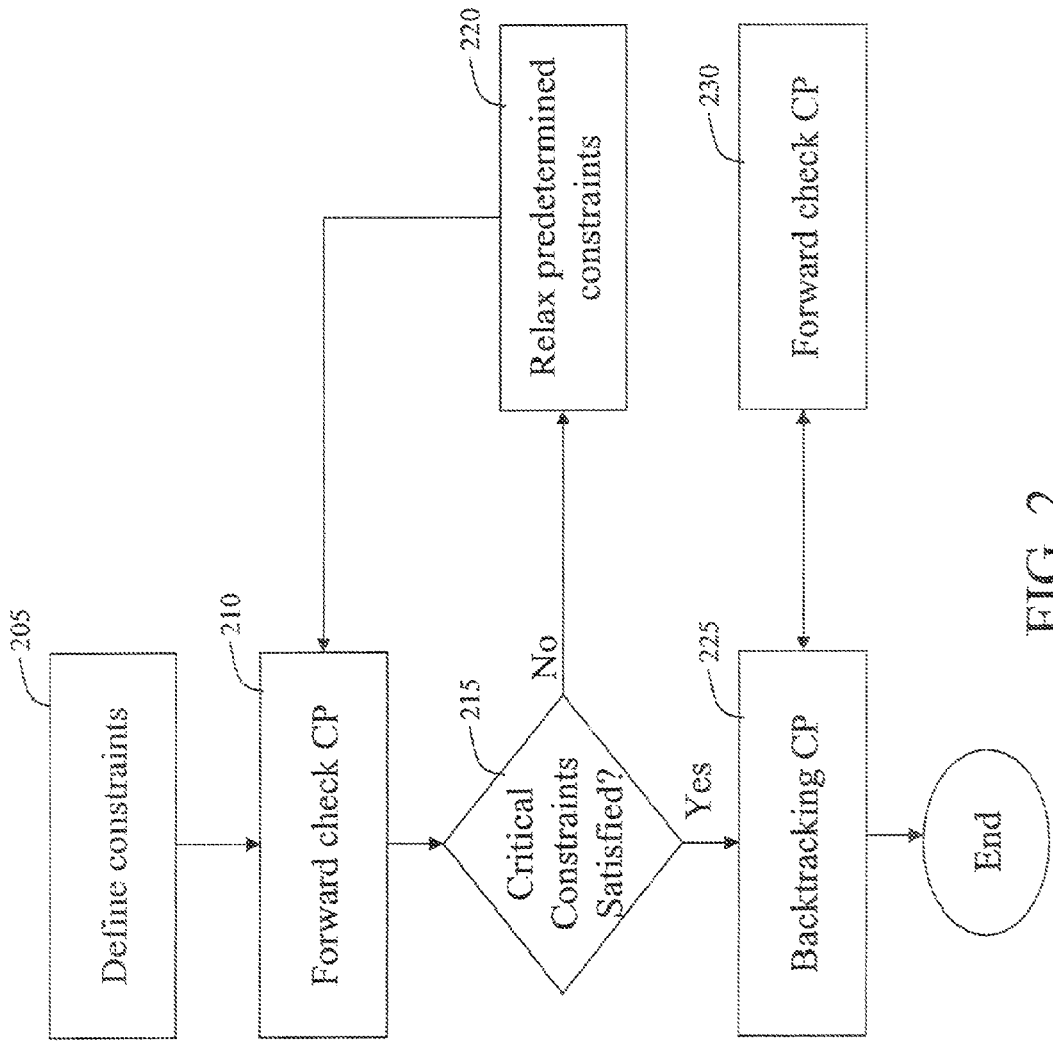
FIG. 2 is a flow diagram of a process for generating a proposed schedule in a network of transportation resources using constraint programming.

FIG. 2 is a flow diagram of a process 200 for generating a proposed schedule in a network of transportation resources using constraint programming. Although the process 200 is described in the context of an airline, the process 200 can be used to generate a proposed schedule in other environments. Initially, input constraints are defined (step 205). The input constraints generally specify the transportation services to be provided and any limitations, rules, or preferences relating to the services. In some airline industry implementations, the input constraints include a listing of every market served by the airline, the number of flights for each market pair, and the gate-to-gate travel time for each market pair. Other constraints include departure ranges and marketing day settings, turnaround times, possible hook-ups and one-stop routings, mandatory and preferred one-stop routings, market spacing data (e.g., gap and compression), station data (gates, simultaneous departure/arrival limitations, curfews, maximum planes to remain overnight, etc.), equipment type counts, business/leisure times, maintenance stations/times, and spacing settings. Some constraints (e.g., gate-to-gate travel time and spacings) can vary by time of day or week. Typically, although not necessarily, the input constraints are relatively fixed and cannot be varied during a particular generation of a proposed schedule. It is possible, such as when the techniques are being used to predict differences in efficiency or productivity between different resource allocations, to generate multiple proposed schedules and to vary the input constraints for the different proposed schedules.

Markets are defined by stations (i.e., airports) associated with the market. For example, Dallas Love Field is associated with the Dallas market and defines the Dallas market from the perspective of an airline. A market pair is a pair of stations between which one or more flights are to be scheduled. Each market pair is directional in that it includes a departure station and an arrival station. Market pairs can be represented by codes for each station. For example, Dallas Love Field is represented by the station code "DAL" and Austin is represented by the station code "AUS". Accordingly, the Dallas-Austin market pair in the Dallas to Austin direction is represented, for example, by "DAL-AUS". "Generally, the number of flights for each market pair in one direction (e.g., "DAL-AUS") has a corresponding number of flights for the market pair in the other direction (e.g., "AUS"-"DAL").

For each market pair, a marketing day is segmented into a number of departure time windows (for the departure station) and corresponding arrival time windows (for the arrival station). In some implementations, an explicit arrival time window need not be defined because it is essentially specified by the departure time window plus some known approximate flight time. Alternatively, an explicit departure time window need not be defined because it can be determined based on the arrival time window minus some known approximate flight time. The marketing day is defined by marketing day constraints for each station. Marketing day constraints generally include a start time and an end time, which may result from airport operating hours and/or a period during which there is demand for flights. The marketing day can be segmented into equal or approximately equal time windows. Alternatively, constraints can be defined that allow some time windows to be smaller than others. For example, time windows during the morning and evening hours may be smaller for some markets to account for typical travel patterns of business travelers (e.g., in accordance with business/leisure constraints). Constraints can also be defined for shaping time windows in accordance with other rules. For example, for a market pair that has only two flights per day, there may be a rule specifying that one departure cannot be later than 9:00 a.m. and that the other departure cannot be earlier than 4:00 p.m. Each time window corresponds to a flight for the market pair.

Figure 3:
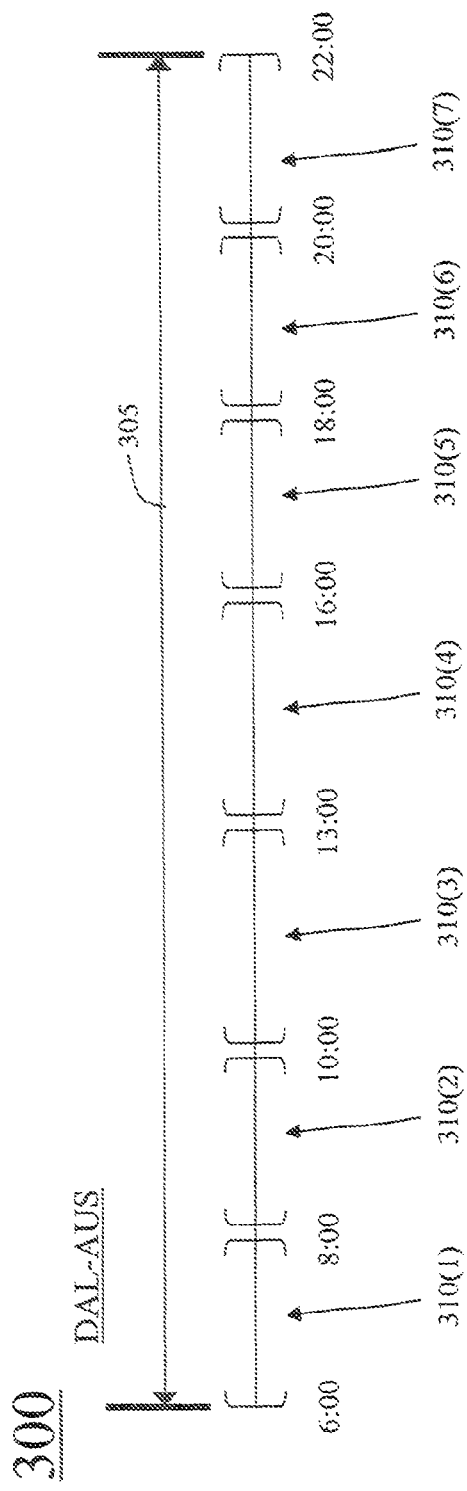
FIG. 3 is a conceptual diagram of a marketing day that is segmented into a number of departure windows.

FIG. 3 is a conceptual diagram 300 of a marketing day 305 that is segmented into a number of departure windows 310. The diagram 300 represents a marketing day 305 for flights from Dallas to Austin (DAL-AUS). In this example, there are to be seven flights per day from Dallas to Austin. Accordingly, the marketing day 305 is segmented into seven departure windows 310 of approximately equal length, although two longer windows appear in the middle of the day. The marketing day 305 begins at 6:00 a.m. and ends at 10:00 p.m. (i.e., 2200). A first departure window 310(1) runs from 6:00 a.m. to 8:00 a.m., a second departure window 310(2) runs from 8:00 a.m. to 10:00 a.m., and so on. Each departure window 310 represents a range of possible departure times for a flight from Dallas to Austin. Although adjacent departure windows 310 are illustrated and described as having a common endpoint (e.g., 8:00 a.m.), in some implementations, adjacent departure windows 310 have different endpoints (e.g., 8:00 a.m. and 8:05 a.m.).

Once the time windows are generated for all market pairs, potential "hook-ups" are identified. In general, the potential hook-ups do not include every theoretically possible hook-up but only those hook-ups that result in a stopover that is less than a predefined maximum threshold but greater than a predefined minimum threshold (e.g., where a departure time window for the second market pair in a hook-up includes at least one potential departure time that is between twenty and forty minutes of at least one potential arrival time within an arrival time window for the first market pair). A minimum turnaround time or stopover constraint and a maximum turnaround time or stopover constraint can be defined. Use of such constraints helps reduce the total number of potential hook-ups. Thus, potential hook-ups are determined based primarily on departure windows and turnaround time constraints. Each particular market pair for a particular time window can have one or more potential hook-ups. For example, a "Dallas-Austin" market pair with an arrival window between 7:00 a.m. and 9:00 a.m. can have potential hook-ups with an "Austin-Houston", "Austin-El Paso", "Austin-Las Vegas", and/or "Austin-Harlingen" market pair having a subsequent departure window.

FIG. 4 is a chart 400 of representative potential hook-ups corresponding to the departure windows 310 of FIG. 3. Each departure window 310 corresponds to a flight from Dallas to Austin that can hook-up with a flight from Austin to some other destination (possibly including returning to Dallas). In this example, there are flights from Austin to Houston (AUS-HOU), Austin to El Paso (AUS-ELP), and Austin to Las Vegas (AUS-LAS). Each market pair includes its own set of departure windows. For example, the Austin to Houston flights include seven departure windows 405, the Austin to El Paso flights include four departure windows 410, and the Austin to Las Vegas flights include three departure windows 415. The chart 400 indicates which of the Dallas to Austin departure windows 310 can potentially hook-up with which of the departure windows 405, 410, and 415 of flights departing from Austin (assuming a gate-to-gate travel time from Dallas to Austin of one hour and a turnaround time of twenty to forty minutes). For example, a Dallas to Austin flight departing between 6:00 a.m. and 8:00 a.m. can potentially hook-up with Austin to Houston flights corresponding to three different departure windows 405(1), 405(2), and 405(3) (e.g., a 6:05 a.m. flight from Dallas could hook-up with a 7:30 a.m. or a 7:45 a.m. flight to Houston and a 7:50 a.m. flight from Dallas could hook-up with 9:15 a.m. flight to Houston).

For some market pairs and time windows, one of the potential hook-ups is a termination. In other words, one of the options, or the only option, for a particular market pair in a particular time window is that the aircraft that flies within the time window does not actually hook-up with another flight. Instead, the aircraft spends an overnight at the station. A flight that arrives at the station for an overnight is a terminating flight. Each terminating flight generally corresponds to an originating flight the following morning and also identifies a flight associated with an aircraft that will "remain overnight." Accordingly, the number of "remain overnight" aircraft should not exceed the number of available aircraft.

As shown in FIG. 2; once the possible hook-ups have been defined, a forward check or some other type of constraint propagation algorithm is applied (step 210). The constraint propagation algorithm serves to influence schedule design and to narrow routing options. In general, the departure windows are narrowed down and potential hook-ups are eliminated. Some narrowing of departure windows and eliminating potential hook-ups may occur as a result of conflicts that arise through the application of constraints. For example, departure times that would create violations of market spacing constraints may need to be eliminated (e.g., to narrow a departure window to preclude the possibility of different flights for the same market pair being too close together or too far apart). In turn, a narrowed window may result in an elimination of one or more potential hook-ups. Narrowing of departure windows and eliminating potential hook-ups may also occur as a result of constraints that define a preference. For example, if a hook-up between particular flights is preferably twenty five minutes rather than twenty minutes, a departure window may be narrowed and/or a potential hook-up may be eliminated as a result of the preference. Constraints that affect constraint propagation can include minimum and maximum remain overnight thresholds, gate constraints (e.g., maximum number of gates available at a station), simultaneous departure and arrival constraints, market spacing constraints, and locked or preferred one-stops (i.e., flights arriving at a station that must or should hook-up with a particular flight or one of a set of flights departing from the station).

Frequently, narrowing down time windows and eliminating potential hook-ups have a derivative effect that propagates through the overall network. For example, narrowing down a particular time window may eliminate one or more potential hook-ups at a current station, which can further eliminate one or more potential hook-ups at a downstream station as a result of rules that effectively require or preclude particular sequences of hook-ups. As another example, station constraints may define a maximum number of gates that can be occupied at any given time. Narrowing down the time windows can result in there being some potential hookups at a particular station that would require a greater number of gates than are allowed. In such a case, rules may be defined for determining which potential hookups are eliminated.

A number of different constraints can impact the narrowing of time windows and elimination of potential hook-ups. The constraints include operational constraints (e.g., station data defining a quantity of gates and a quantity of required or possible overnight planes; valid equipment types; maintenance, turnaround times, and the like) and marketing constraints (e.g., limiting or shaping flight departure times; spacings between departing flights for the same market pair; through patterns; and the like). Constraints can also define other schedule generation parameters, such as in what increments departure windows should be narrowed (e.g., one minute or five minutes). In some implementations, an algorithm applies the constraints in an iterative process. In each iteration, the constraints are applied in accordance with a defined hierarchy designed to prevent changes from being made lower in the hierarchy that tend to conflict with changes made higher in the hierarchy. In addition, changes are made gradually to avoid conflicts. Each time a change is made, the process returns to a starting position to begin a new iteration.

Once the forward check constraint propagation algorithm is complete, it is determined whether one or more critical constraints are satisfied (step 215). In some cases, all of the constraints may be handled during constraint propagation, in which case this determination may be unnecessary. If, however, one or more critical constraints are not satisfied, predetermined constraints are relaxed (step 220) and the forward check constraint propagation algorithm is applied again (step 210). Relaxation of constraints and forward check constraint propagation followed by testing for satisfaction of critical constraints are performed until the critical constraints are satisfied. The constraints to be relaxed are generally selected so as to increase the likelihood that a solution can be found. Once the critical constraints are satisfied, typically there are significantly fewer schedule options than before application of constraint propagation.

Which constraints are critical and the values of critical constraints are generally specific to a particular implementation and/or run sequence of the overall constraint programming algorithm. In other words, a constraint may be defined as critical for a particular run sequence even if it is possible to implement a schedule that does not include the constraint. For example, an initial application of forward check constraint propagation may generate a proposed schedule that requires more than a preferred number of aircraft. The preferred number of aircraft may be considered a critical constraint for purposes of a current search for a solution, even though additional aircraft may be available (e.g., if a solution cannot be found with the current critical constraints).

Once the critical constraints are satisfied, backtracking constraint programming is performed (step 225). Backtracking constraint programming serves to assign routes, allocate equipment to the routes, and finalize schedule design. For example, a rules-based trial and error (e.g., backtracking) process is initiated to identify route assignments, equipment allocations, and a final schedule design that are feasible. As a result, routing, fleeting, and schedule design are determined more or less simultaneously. In other words, constraint programming is used to work towards a solution of all three of these components in parallel rather than in series. Each time a change is finalized (e.g., by assigning a route, allocating equipment, or making a schedule design change), constraint propagation can be performed to further refine the schedule design (step 230) by further narrowing departure windows and eliminating possible hook-ups followed by a return to the backtracking sequence. The constraint propagation that is incorporated into the backtracking sequence can be similar to, different from, or the same as the prior forward check constraint propagation algorithm.

In some implementations, a rules-based trial and error process is used to perform "balancing." Balancing means that the number of each equipment group (or other transportation resources) at each station is the same at the end of each day or other repeating period (e.g., two days or a week). The rules-based trial and error process can be performed by a rules-based route generator that uses as its input: the narrowed down time windows and potential hook-ups; the number of planes by equipment type; and the potential and/or predefined originating and terminating flights. Starting with a selected station, a sequence of hook-ups is selected in accordance with predefined constraints (e.g., stations that are preferred or precluded for a particular equipment type, predefined one-stops, and direction flow rules). The sequence of hook-ups represents the route traveled by a single aircraft in a particular time period (e.g., generally a single day but other periods are possible, such as a two day period).

The sequence of hook-ups begins with an originating flight and ends with a terminating flight. The station corresponding to the originating flight need not be the same, and typically is not the same, as the station corresponding to the terminating flight. Once a sequence of hook-ups for one aircraft is selected, another sequence of hook-ups is selected for another aircraft starting from the station corresponding to the terminating flight of the previous aircraft. Sequences of hook-ups are repeatedly selected in this manner for all of the aircraft in a particular equipment group to generate an overall sequence of hook-ups for the particular equipment group. The goal of balancing is generally to ensure that hook-up sequences for a single equipment group form one or more loops, each of which begins and ends at the same station. This ensures that the appropriate type of equipment is available each day at each station.

Figure 5:
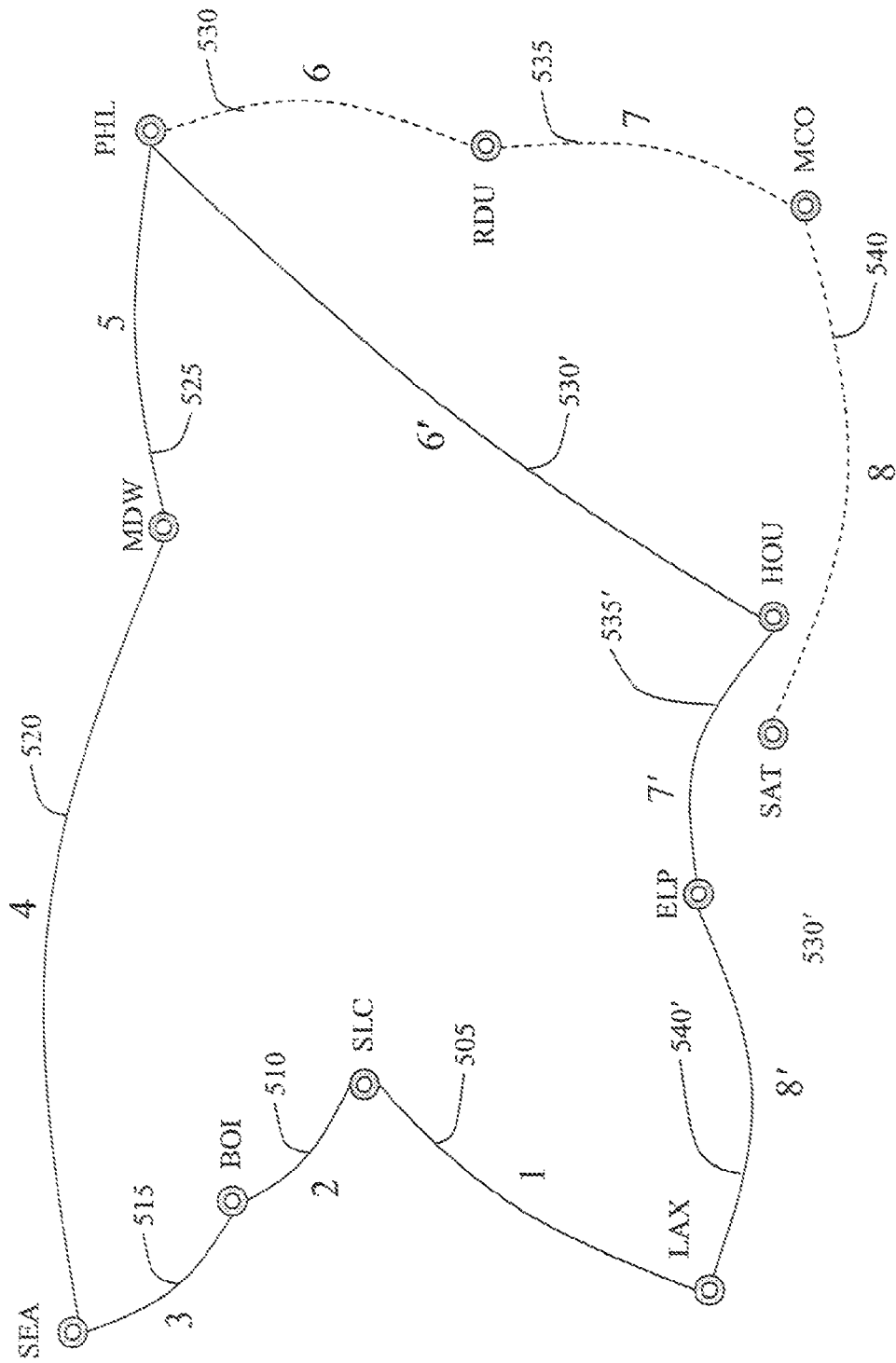
FIG. 5 is a diagram that illustrates a simplified balancing problem.

FIG. 5 is a diagram that illustrates a simplified balancing problem. For purposes of illustrating balancing in this example, it is assumed that a single aircraft is to return to its originating station after exactly eight flights. Typically, however, balancing will involve multiple aircraft and will be constrained by the length of the marketing day, rather than an exact number of flights. The aircraft originates with a first flight 505 from Los Angeles to Salt Lake City (LAX-SLC). A sequence of hook-ups is selected that results in a second flight 510 from Salt Lake City to Boise (SLC-BOI), a third flight 515 from Boise to Seattle (BOI-SEA), a fourth flight 520 from Seattle to Chicago (SEA-MDW), a fifth flight 525 from Chicago to Philadelphia (MDW-PHL), a sixth flight 530 from Philadelphia to Raleigh-Durham (PHL-RDU), and a seventh flight 535 from Raleigh-Durham to Orlando (RDU-MCO). To satisfy the constraints in this example, it is necessary to hook-up with a flight from Orlando to Los Angeles. Other constraints or limitations on available departure windows, however, may prevent such a flight from being available for hook-up. For example, the most westerly potential hook-up destination may be an eighth flight 540 from Orlando to San Antonio (MCO-SAT). Accordingly, it may be necessary to backtrack to a previous station and assign new hook-ups. By backtracking to Philadelphia and assigning an alternative sixth flight 530' from Philadelphia to Houston (PHL-HOU), an alternative seventh flight 535' from Houston to El Paso (HOU-ELP), and an alternative eighth flight 540' from El Paso to Los Angeles (ELP-LAX), it is possible to return to the starting station.

Once sequences of hook-ups are selected for a particular equipment group, sequences of hook-ups are selected in the same manner for another equipment group. Sequences of hook-ups are repeatedly selected in this manner for all of the different equipment groups in an overall fleet.

Generally, an equipment group is defined by all (or a subset) of an airline's aircraft of the same or a similar type. For example, one equipment group includes all of an airline's Boeing 737-500's, while another equipment group includes all of the airline's 737-700's. As noted above, the goal of selecting sequences of hook-ups is to balance each equipment group such that the number of aircraft in each equipment group is the same at the beginning and end of each, time period for each station. Accordingly, the overall sequence of hook-ups for each equipment group can be thought of as a loop (or multiple loops) including individual routes that link together and having the same starting and ending point. To arrive at this result, it is often necessary to backtrack up the overall sequence of hook-ups and to try alternative hook-ups. For example, an overall sequence of hook-ups initially may be selected such that it becomes impossible or undesirable to end up at the starting point and still comply with the predefined rules. As a result, a hook-up higher up the overall sequence is selected and a new overall sequence is generated to from that point. Such backtracking is repeated (possibly starting from multiple different points) until obtaining an acceptable overall sequence that ends at the same station as it starts.

Generating an overall sequence typically starts from a large market (i.e., a station that includes a relatively large number of overnight planes). Selecting such a starting point provides greater flexibility in generating the overall sequence because there are more terminating flights at the station that can serve as an ending point in the overall sequence as compared to a small market. In other words, using a large market as a starting point makes it easier to identify an overall sequence that ends at the same place it starts.

In some cases, partially through generating an overall sequence, a subset of the sequences arrives at the starting point before the overall sequence for the entire equipment group is complete. In such a case, it is possible to move to a different station to begin another subset of sequences. Accordingly, a particular equipment group can have multiple different loops, each with there own respective starting and ending station. In addition, multiple, mutually exclusive overall sequences can be generated to enable a selection among different alternatives (e.g., to select an alternative that best complies with certain constraints).

Some predefined constraints can define preferences for selecting individual hook-ups. For example, the predefined constraints can include a preference for hook-ups that result in a consistent direction flow (e.g., so that a westbound market pair, such as New Orleans-Houston, hooks-up with a non-westbound market pair, such as Houston-Little Rock, in an undesirable manner), a desirable one-stop route (e.g., a hook-up where there is significant demand for through traffic, such as Austin to El Paso to Las Vegas), or an increased flexibility in departure times. Other predefined constraints can restrict the overall sequence of hook-ups. For example, an overall sequence may be required to arrive at a station with a maintenance facility (e.g., so that aircraft can periodically be taken out of service for maintenance). Because of the need to periodically perform maintenance, an overall sequence may account for fewer than all of the aircraft in a particular equipment group to allow the aircraft to be cycled through a regular maintenance program that requires one or more of the aircraft in the group to be temporarily out of service. In general, some of the constraints are operational constraints (e.g., numbers of gates and maintenance requirements), and, as a result, operational requirements are automatically accounted for.

In addition to balancing, backtracking constraint programming (step 225) and any associated constraint propagation (step 230) can further take into account maintenance requirements (e.g., to ensure that each sequence of hook-ups results in equipment remaining overnight at a maintenance facility), positioning (e.g., to ensure that equipment is at a particular location at a selected time), turnaround time preferences (e.g., to reduce undesirably long turnarounds or increase undesirably short turnarounds), and market spacing preferences. The result is an overall flight schedule that encompasses schedule design, routing, and fleeting. In some cases, the sequences of hook-ups may include some degree of flexibility in departure times. This flexibility can be used, in accordance with the turnaround time preferences, to increase the turnaround times for flights that have historically higher relative passenger counts, which further whittles down the possible departure times. The routes can also be "compressed" into as short an operating day as the time windows allow. By this point, most flights settle into a single possible departure time.

The generation of the overall flight schedule (including segmenting the market days into time windows, identifying potential hook-ups, narrowing the time windows, and the rules-based route generation) can be performed automatically in a constraint programming module based on the constraints. In some cases, certain operations can be performed manually. For example, the results of a process that is performed automatically can be reviewed and modified manually (e.g., by changing values, locking down windows or hook-ups, and the like). In addition, the overall flight schedule can be implemented as an actual flight schedule or can be used as a starting point, or "seed," for further automatic processing or manual modification.

Figure 6:
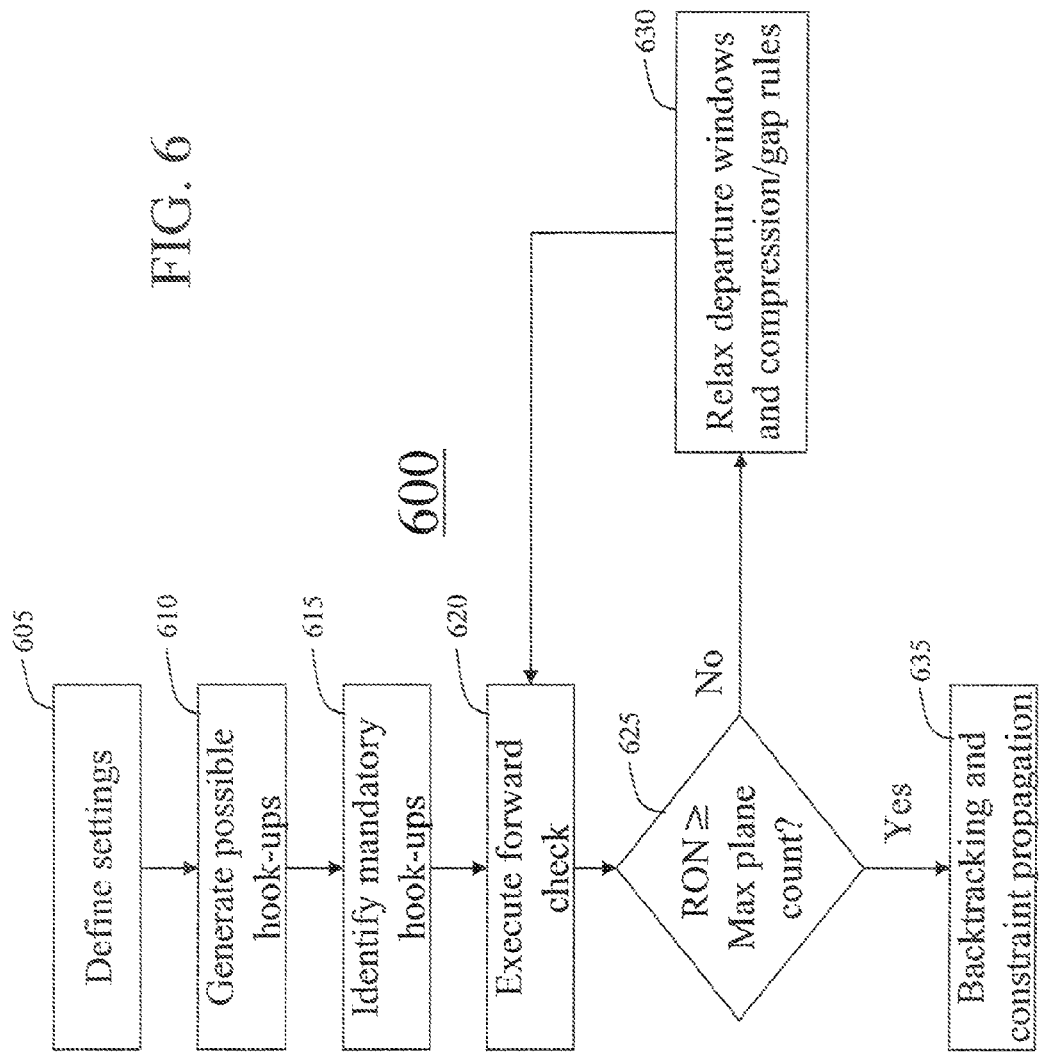
FIG. 6 is a flow diagram of a more detailed constraint programming process for generating a proposed schedule in an airline network.

FIG. 6 is a flow diagram of a more detailed constraint programming process 600 for generating a proposed schedule in an airline network. Initial setting are defined (step 605). The settings include the markets to be served; the number of flights per day for each market pair; gate-to-gate travel time; departure ranges, which can be influenced by market size, empirical demand data, and business versus leisure travel considerations; and minimum and maximum turnaround times, which can vary depending on flight distance, origination, destination, historical demand, and the like. Based on the departure ranges and turnaround times, all possible hook-ups are generated (step 610). Any mandatory hook-ups (e.g., pre-selected through-routings or flights that are required to result in a through-routing from a subset of pre-selected through-routings) are identified (step 615).

A forward check subroutine is executed (step 620) to reduce the number of hook-ups and the departure ranges and to seek a minimum best case scenario on remain overnight counts. After executing the forward check subroutine, a determination is made whether a remain overnight count exceeds a maximum plane count (step 625). The remain overnight count corresponds to the minimum cumulative number of aircraft that must remain overnight at a station based on the current state of the departure ranges and possible hook-ups. For example, if a departure range for a particular flight requires that the flight arrive at a destination station too late to hook-up with another flight before a station curfew, the particular flight must remain overnight at that station. Similarly, if a station has more flights arriving after a certain time of day than departing flights, at least one flight must remain overnight at the station. If the remain overnight count exceeds the maximum plane count, departure windows throughout the overall schedule are expanded and market spacing constraints are relaxed (e.g., to allow consecutive flights for the same market pair to depart as little as one hour and forty five minutes apart rather than no less than two hours apart) (step 630). For example, the market spacing constraints can be relaxed by a predetermined percentage.

Following this relaxation of departure and market spacing constraints, the process 600 returns to the forward check subroutine (step 620). Subsequently, testing of the remain overnight count versus the maximum plane count (step 625) and constraint relaxation (step 630) is repeated until the remain overnight count is less than or equal to the maximum plane count. Once the remain overnight count is low enough, a backtracking and constraint propagation subroutine is executed (step 635).

Figure 7:
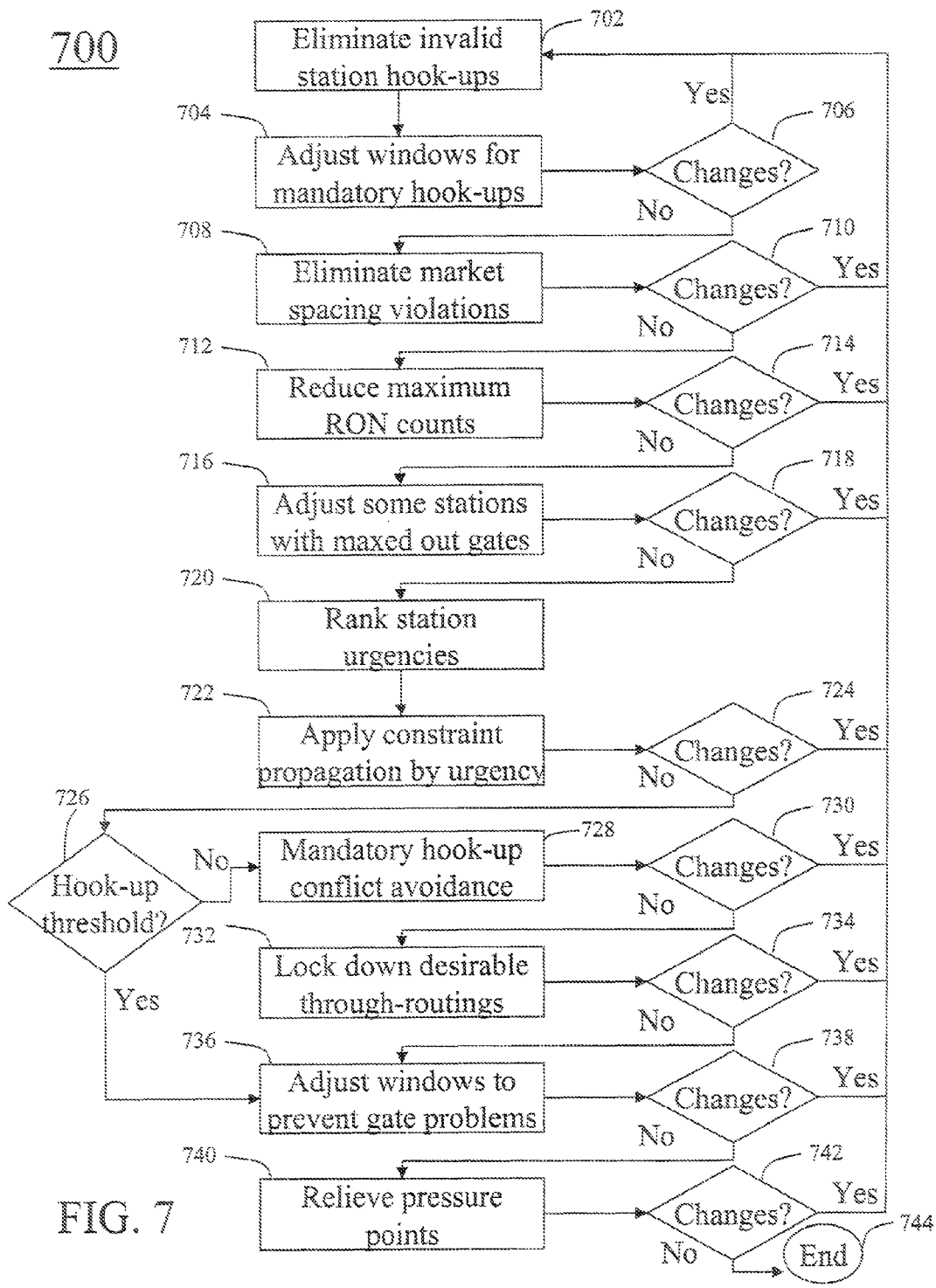
FIG. 7 is a flow diagram of a forward check subroutine as used in the process illustrated in FIG. 6.

FIG. 7 is a flow diagram of a forward check subroutine 700 as used in the process 600 illustrated in FIG. 6. Initially, station hook-ups that are no longer valid are eliminated (step 702). Station hook-ups can be identified as invalid by consistency testing each station hook-up against all of the constraints that relate to the station hook-up. For example, a hook-up may become invalid if a departure window is narrowed such that a previously possible hook-up would require a turnaround time that exceeds a maximum threshold, or if a mandatory hook-up (see step 615 of FIG. 6) precludes a hook-up that was originally identified as a possibility (see step 610 of FIG. 6). Departure windows for mandatory hook-ups are adjusted (step 704). For example, if a departure window for one flight in a mandatory hook-up is narrowed, it may result in a corresponding change to a departure window for the other flight in the mandatory hook-up. It is then determined whether any changes have occurred as a result of steps 702 or 704 (step 706). If so, the subroutine 700 returns to step 702.

Otherwise, departure times that would create market spacing (i.e., gap or compression) violations are eliminated (step 708). For example, if a first of two adjacent departure windows for the same market pair includes specific departure times that would necessarily be either too far from or too close to all of the departure times in the second of the two adjacent departure windows, the first departure window is narrowed to eliminate the specific departure times. If step 708 results in a change (as determined at step 710), the subroutine 700 returns to step 702. Otherwise, maximum remain overnight counts for each station are reduced as necessary (step 712). In general, the cumulative minimum number of planes that must remain overnight should not exceed the available number of planes. If the maximum remain overnight counts for one or more stations would allow a cumulative remain overnight count to exceed the available number of planes, the maximum remain overnight counts for those one or more stations is reduced. It should be noted, however, that, in some cases, it may not be possible to comply with the maximum remain overnight counts at the end of one iteration of the forward check subroutine 700, in which case it is necessary to relax certain constraints and execute the forward check subroutine 700 again (see steps 625 and 630 of FIG. 6).

If step 712 results in a change (as determined at step 714), the subroutine 700 returns to step 702. Otherwise, adjustments are made for stations that have reached maximum gate and/or simultaneous departure/arrival constraints but that have not reached a station-specific maximum remain overnight threshold (step 716). For example, if an airline has access to only three gates at a particular station and there are three flights with narrow departure windows around 10:00 a.m., a fourth flight with a wider departure window that includes 10:00 a.m. can be adjusted by removing one or more departure times around 10:00 a.m. (e.g., to "punch a hole" in the departure window). Stations that have reached the applicable maximum remain overnight threshold have less flexibility, so changes relating to maximum gate and simultaneous departure/arrival constraints are delayed until later in the subroutine 700 (i.e., until other consistency tests have been performed).

If step 716 results in a change (as determined at step 718), the subroutine 700 returns to step 702. Otherwise, stations are ranked according to urgency criteria (step 720). Ranking stations according to the urgency criteria sets forth an order of priority for performing additional consistency testing and/or constraint propagation (i.e., to narrow departure windows and eliminate hook-ups). For example, stations are ranked according to whether each station has reached a maximum remain overnight threshold, whether departure windows for the station require at least one plane to sit on the ground for a long period (e.g., exceeding a maximum turnaround threshold), whether the station includes a relatively large number of mandatory hook-ups (see step 615 of FIG. 6), whether a probability function indicates a risk that a maximum gate threshold will be violated, whether the station does not include enough early originating flights or late terminating flights to meet a minimum remain overnight threshold, and how many daily departures the station has (e.g., smaller stations receive higher priority).

Consistency tests and/or constraint propagation are applied to the stations in the order of the station urgency rankings from step 720 (step 722). This testing includes examining all of the station hook-ups in combination to determine whether there are any conflicts. Some hook-ups may be invalid because they conflict with other, more necessary hook-ups. As a simple example, if two flights arrive into Dallas, one from Austin and the other from San Antonio, and the Austin flight (AUS-DAL) can hook-up with a flight to Tulsa (DAL-TUL) or a flight to Oklahoma City (DAL-OKC), while the timing of the San Antonio flight dictates that it can only hook-up with the flight to Tulsa (DAL-TUL), the possible Austin-Dallas-Tulsa hook-up should be eliminated. This testing for conflicts can involve other combinations involving a greater number of flights and/or stations. The testing can also include eliminating invalid departure times of flights (possibly while ignoring maximum turnaround time constraints) and then eliminating invalid departure times of flights involved in mandatory-hook-ups (while considering maximum turnaround time constraints). At this point, the prior testing generally eliminates the possibility of exceeding the maximum remain overnight threshold, so testing can involve making adjustments for stations that have reached maximum gate and/or simultaneous departure/arrival constraints and that have reached a station-specific maximum remain overnight threshold.

If step 722 results in a change (as determined at step 724), the subroutine 700 returns to step 702. Otherwise, a determination is made as to whether a hook-up threshold has been reached (step 726). The hook-up threshold is used to determine whether sufficient flexibility still exists in the current state of the schedule design to make changes relating to mandatory hook-ups. If the threshold has not been reached, mandatory hook-ups providing through-routings that conflict with direct flights are adjusted to avoid potential conflicts (step 728). For example, if a mandatory hook-up of a Dallas to Houston flight and a Houston to Corpus Christi flight includes departure windows that overlap or are near a departure window for a direct flight from Dallas to Corpus Christi, the departure windows for the flights involved in the mandatory hook-up can be narrowed to avoid having a one-stop flight in competition with a direct flight.

If step 728 results in a change (as determined at step 730), the subroutine 700 returns to step 702. Otherwise, potential hook-ups that result in a desirable through-routing are "locked down" (step 732) (i.e., by eliminating other possible hook-ups involving the same flights). For example, a matching calculation may be used to determine the desirability of alternative hook-ups. The matching calculation may consider demand and how many alternative through-routings are potentially available to meet that demand. For instance, a Baltimore to Kansas City flight potentially hooks-up with a flight to Los Angeles or a flight to Albuquerque. If there is a daily demand of two hundred passengers for Baltimore to Los Angeles through-routings and fifty passengers for Baltimore to Albuquerque, it may be more desirable to lock down the hook-up to the Los Angeles flight. However, if there are currently ten possible through-routings from Baltimore to Los Angeles and only one from Baltimore to Albuquerque, it may be more desirable to lock down the hook-up with the Albuquerque flight despite the lower demand because there are many more potential alternatives for traveling to Los Angeles.

If step 732 results in a change (as determined at step 734), the subroutine 700 returns to step 702. Otherwise, if the hook-up threshold has been reached at step 726 or if it is determined at step 734 that no changes have occurred, adjustments are made to departure windows to help prevent problems with gate and simultaneous departure/arrival constraints (step 736). These adjustments are similar to those made in steps 716 and 722 except that they are based on a relative probability of conflicts rather than a relative certainty of conflicts, as in steps 716 and 722.

If step 736 results in a change (as determined at step 738), the subroutine 700 returns to step 702. Otherwise, measures are taken to relieve departure window and/or hook-up constraints that are likely to cause problems (step 740). For example, a hypothetical schedule can be generated from the current state by selecting the midpoint of each departure range as a departure time, selecting hook-ups based on the selected departure times, and determining which stations have constraint violations or problems (e.g., where the minimum best case remain overnight count increases from five to ten). Adjustments to the departure windows and possible hook-ups can be made to relieve scheduling pressures (e.g., to reduce the likelihood of having a situation where no solution exists). If step 740 results in a change (as determined at step 742), the subroutine 700 returns to step 702. Otherwise, the subroutine 700 is complete (step 744).

Figure 8:
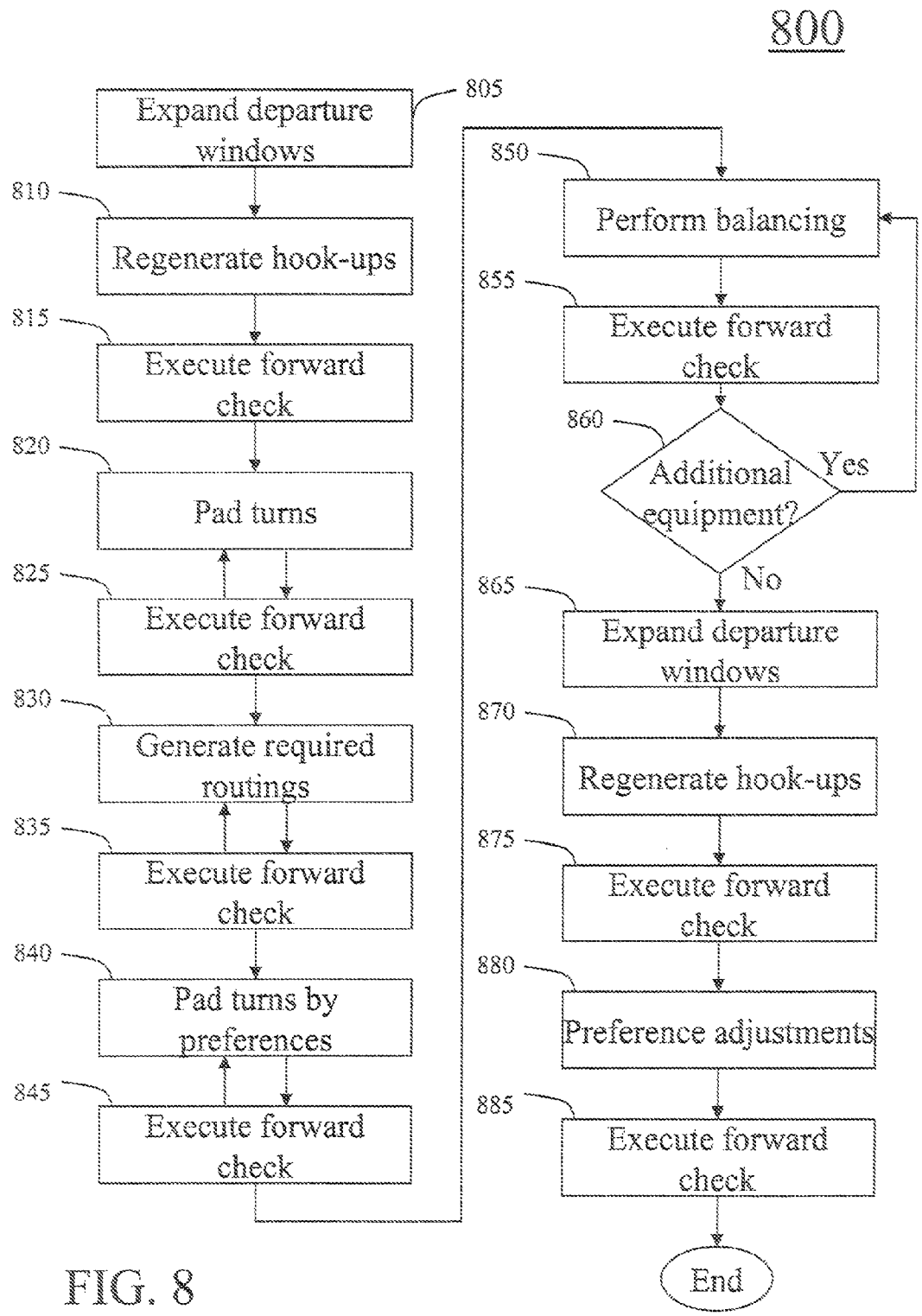
FIG. 8 is a flow diagram of a backtracking and constraint propagation subroutine as used in the process illustrated in FIG. 6.

FIG. 8 is a flow diagram of a backtracking and constraint propagation subroutine 800 as used in the process 600 illustrated in FIG. 6. Initially, departure windows are expanded (step 805), and hook-ups are regenerated (step 810). Expansion of departure windows is performed multiple times throughout the backtracking and constraint propagation subroutine 800, which allows unnecessary prior narrowing of windows to be removed. During the forward check subroutine 700, some of the changes are preventative measures used to avoid problems that may never materialize. Thus, by expanding departure windows as the schedule is refined, some of the unnecessary narrowing can be reversed. In general, the expansion of departure windows in step 805 and throughout the backtracking and constraint propagation subroutine 800 is not permitted to expand beyond the bounds of expansion in step 630 of FIG. 6. Expanding the departure windows, for many flights, increases the number of other flights with which there can be a potential hook-up. Regenerating hook-ups involves adding potential hook-up that result from the expanded departure windows. Next, the forward check subroutine 700 is executed (step 815.

Turnaround times for some markets, inbound flights, and/or outbound flights are increased based on preference constraints until the total number of potential hook-ups reaches some minimum threshold (step 820). For example, based on an anticipated passenger load, it may be desirable to increase the minimum turnaround time for certain flights from twenty minutes to twenty five minutes. Increases in the minimum turnaround times can be performed one at a time in order of urgency (e.g., based on which flights are most likely to have problems meeting the turnaround time). Hook-ups with a twenty minute minimum turnaround time are adjusted, if possible, in order of urgency, followed by hook-ups with a twenty five minute minimum turnaround time. The minimum threshold ensures some remaining level of flexibility. After each increase in a turnaround time, the forward check subroutine 700 is executed (step 825), and after each execution of the forward check subroutine 700 at step 825, an increase in another turnaround time is applied at step 820 until the minimum threshold is reached.

Next, required routings are generated using backtracking (step 830). Required routings include routings used for purposes of maintenance and positioning aircraft at particular stations. For example, each aircraft in a fleet may periodically need to terminate/originate at a maintenance facility, possibly with an early termination or late origination. There may also be a need for a particular aircraft type to originate or terminate at a particular station for other purposes or to have an extra block of ground time at a particular station. Such required routings are generated using a forward or backward trial and error backtracking technique starting from the maintenance station or the station at which an aircraft is to be positioned. After building each required routing, the forward check subroutine 700 is executed (step 835), and after each execution of the forward check subroutine 700 at step 835, another required routing is generated at step 830 until all required routings are generated. In some implementations, the forward check subroutine 700 may be executed after selecting each hook-up in the trial and error procedure. If a selected hook-up results a failure in consistency testing, the changes made subsequent to selecting the hook-up are rolled back (i.e., undone) and a different hook-up is selected.

Turnaround times are again increased for some markets, inbound flights, and/or outbound flights based on preference constraints (step 840). Increases are performed until the total number of potential hook-ups reaches some minimum threshold in the same manner as in step 820 but using a threshold that is generally less than the threshold in step 820. After each increase in a turnaround time, the forward check subroutine 700 is executed (step 845), and after each execution of the forward check subroutine 700 at step 845, an increase in another turnaround time is applied at step 840 until the minimum threshold is reached.

Balancing is performed for a particular equipment type using a backtracking and/or other consistency testing or constraint propagation technique (step 850), followed by execution of the forward check subroutine 700 (step 855). If addition equipment types have not yet been balanced (as determined at step 860), the subroutine 800 returns to step 850 to balance another equipment type. The order in which equipment types are balanced is typically dependent upon the restrictions on each equipment type and/or ease of balancing each equipment type. More particularly, the order of balancing may relate to a consideration of flexibility versus demand. For example, aircraft that have the most or fewest restrictions based on noise constraints, size, fuel efficiency, or other characteristics may be balanced earlier than other aircraft types. When there are multiple different equipment types, once all but one equipment type has been balanced, the last equipment type is automatically balanced.

Once all equipment types are balanced, departure windows are expanded (step 865), and hook-ups are regenerated within each equipment type (step 870). The forward check subroutine 700 is executed (step 875), and adjustments are made in accordance with selected preferences (step 880). Preferences can involve increasing minimum turnaround times, compressing originating and terminating flights (e.g., to remove unnecessarily early departures and late arrivals to make an aircraft's day as short as possible), reducing potentially large turnaround times (e.g., by narrowing departure windows), improving market spacing, selecting desirable through-routings, eliminating undesirable routings (e.g., routings that make it difficult to allocate crews, routings that cause an undesirable looping of aircraft, or flights that have undesirable combinations of origination and destination locations), and possibly narrowing departure windows to a single possibility. The forward check subroutine 700 is executed after each adjustment or set of adjustments (step 885). The result is a single proposed schedule (or a proposed schedule that includes some ranges of alternative departure windows and/or hook-ups) that satisfies any mandatory constraints and as many preference constraints as possible.

Figure 9:
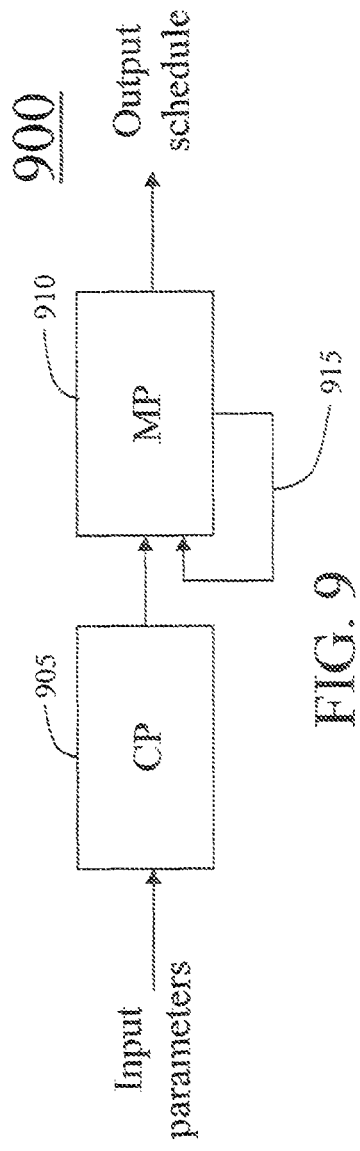
FIG. 9 is a block diagram of a system for producing a schedule.

In some implementations of a scheduling process, a proposed overall schedule that results from the constraint programming module or process can be used as a "seed" for a mathematical programming module or process that refines the proposed schedule in accordance with an objective function. FIG. 9 is a block diagram of a system 900 for producing a schedule. A constraint programming (CP) module 905 is used to generate one or more seed schedules based on input parameters that define the problem and provide constraints. Multiple seed schedules can be generated by varying the input parameters and/or by using randomization factors in the constraint programming module (e.g., to randomize the order in which certain constraints are applied, particular variables are handled, or values are assigned). The input parameters can also be changed to determine the effect of altering operational constraints, such as the number of aircraft, the number of gates at an airport, the number of flights between different markets, and the like. The constraint programming module 905 is used to generate one or more solutions to a scheduling problem that has extensive variables. For example, subject to limitations imposed by the constraints, each segment (e.g., flight) can have a wide range of possible departure times and can hook-up with any segment that results in a consecutive two segment sequence.

A seed schedule from the constraint programming module 905 is used by a mathematical programming (MP) module 910 to refine the proposed, or seed, schedule in accordance with an objective function. For example, the mathematical programming module 910 alters the values of some or many variables (e.g., departure times and hook-ups) to produce a refined schedule that increases (with respect to the seed schedule) efficiency, revenue, compliance with preferences, and the like, as measured by an objective function. The refined schedule can be used as a new seed schedule for further refinement by the mathematical programming module 910 (as indicated at 915). After a selected number of iterations, after a selected time, or upon reaching a desired level of, e.g., efficiency, revenue, of improvement, the refined schedule generated by the mathematical programming module 910 is used as a final schedule. The mathematical programming module 910 is used to generate a solution to a scheduling problem that has more controlled variables than the constraint programming module 905. For example, a limited amount of flexibility is allowed for changes in departure times and hook-ups. As an alternative to using a constraint programming output as a seed schedule, the mathematical programming module or process can operate on a seed schedule that is manually generated or that represents a currently implemented schedule.

Figure 10:
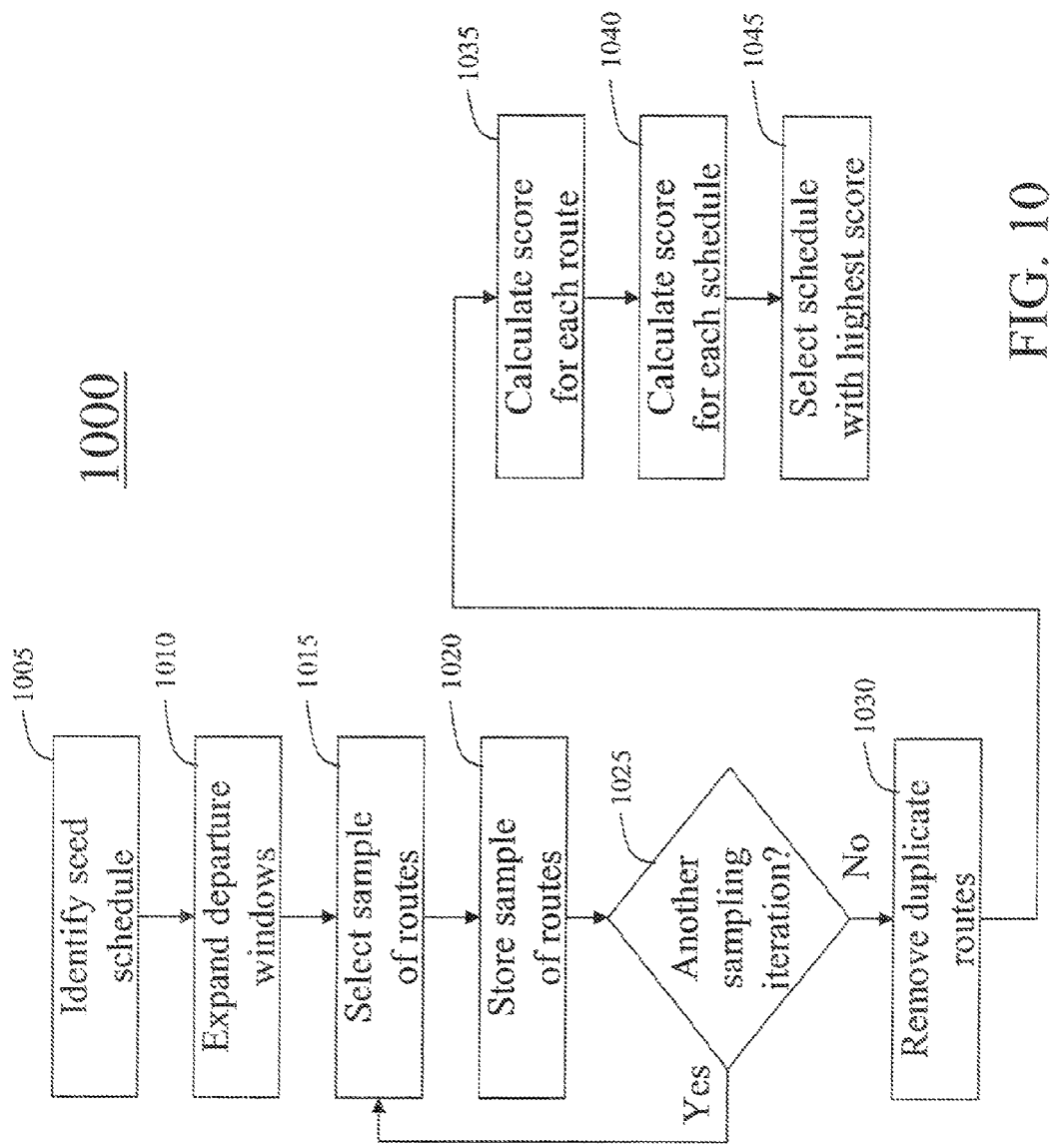
FIG. 10 is a flow diagram of a mathematical programming process for tuning a schedule.

FIG. 10 is a flow diagram of a mathematical programming process 1000 for tuning a schedule. The mathematical programming process 1000 can be implemented in the mathematical programming (MP) module 910 of FIG. 9. The mathematical programming process 1000 operates to incrementally improve a seed schedule over numerous iterations to increase a value representing total demand met by a particular overall schedule. The mathematical programming process 1000 or module 910 can be implemented using linear programming, such as using CPLEX, available from ILOG of Mountain View, Calif., or other similar products. The mathematical programming process 1000 uses many of the same rules and constraints as the constraint programming techniques described above but further explicitly considers demand. In particular, the mathematical programming process 1000 uses the same, or most of the same, operational constraints and marketing constraints as the constraint programming module but also uses a demand function. The demand function is an actual curve or other data, based on historical data and/or market research, that models demand based on, for example, a particular market, market size, departure times, how close and how far flights for the same market pair are spaced apart, nonstop traffic, one-stop traffic, multi-stop traffic, and any other quality or characteristic that may affect demand. Accordingly, the seed schedule, constraints, and demand function serve as inputs for the mathematical programming process.

Initially, a seed schedule is identified (step 1005). The departure windows in the seed schedule are expanded by a specified amount of time (e.g., thirty minutes) in small increments (e.g., one or five minute increments) to produce multiple candidate departure times for each flight in the overall schedule (step 1010). As a result, for each flight in the seed schedule, several (e.g., ten to twelve) alternative, candidate departure times are produced, resulting in a very large number of candidate routes. For example, a route in the seed schedule for an single aircraft may include five flights in a day (e.g., corresponding to four hook-ups that link five sequential market pairs). By expanding the departure times for each of the five flights, there may be roughly a thousand, or more, different possible combinations of departure times for the same sequence of market pairs. When this expansion is carried out on all of the routes in the seed schedule, the total number of routes is increased by potentially several orders of magnitude.

Figure 11:
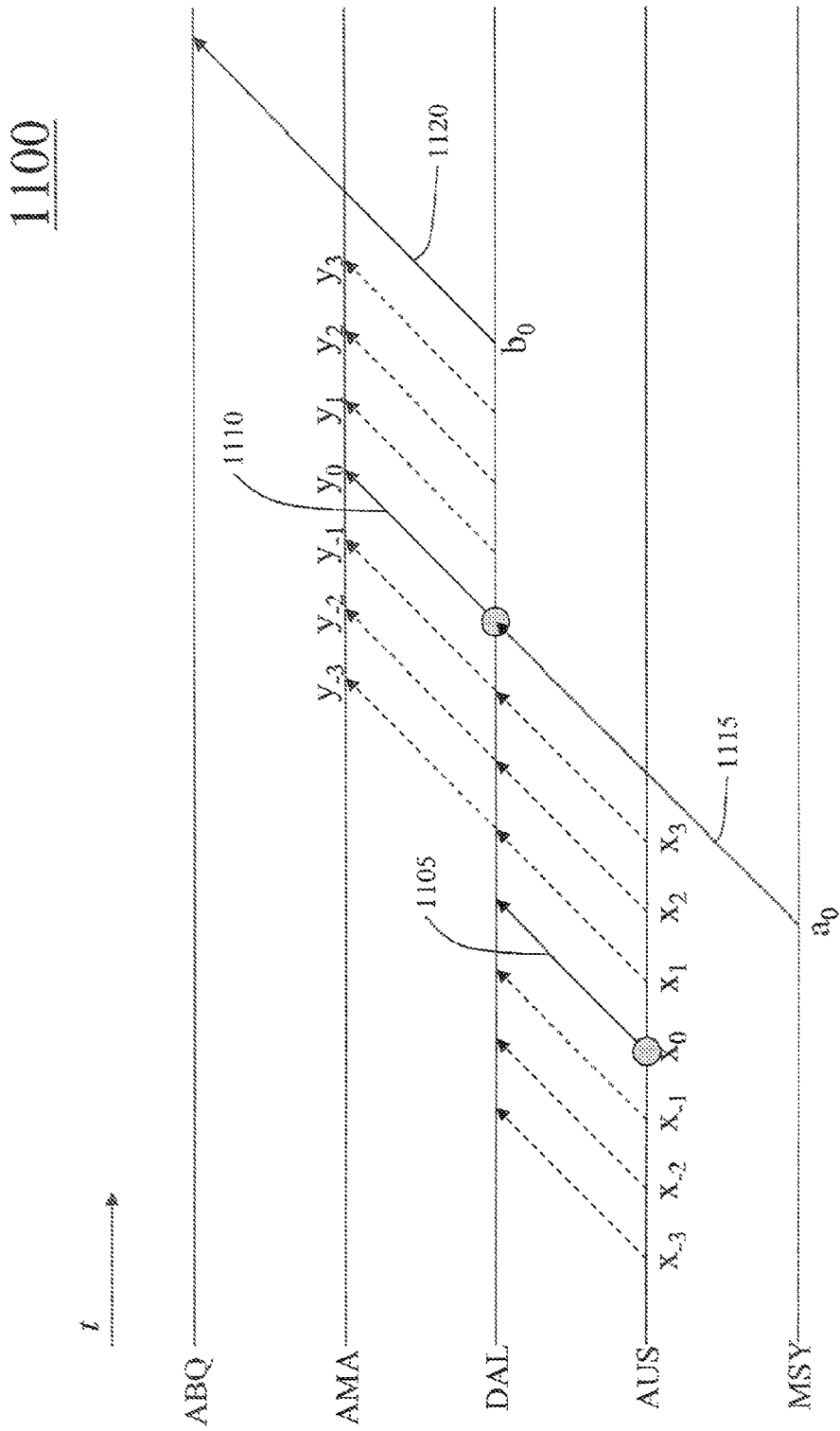
FIG. 11 is a schematic diagram illustrating an expanding departure times for a portion of a route in a seed schedule to produce alternative candidate departure times.

FIG. 11 is a schematic diagram 1100 illustrating an expanding departure times for a portion of a route in a seed schedule to produce alternative candidate departure times. A seed schedule includes a flight 1105 from Austin to Dallas departing at time $x_0$ that hooks-up with a flight 1110 from Dallas to Amarillo departing at time $y_0$. The departure times are expanded in certain increments to produce alternative Austin to Dallas departure times of $x_{-3}, x_{-2}, x_{-1}, x_1, x_2,$ and $x_3$ and alternative Dallas to Amarillo departure times of $y_{-3}, y_{-2}, y_{-1}, y_1, y_2,$ and $y_3$. As a result, many new combinations of departure times can be used without changing the hook-up of the Austin to Dallas flight 1105 with the Dallas to Amarillo flight 1110. For example, the $x_{-3}$ departure to Dallas can hook-up with any one of the $y_{-3}, y_{-2}, y_{-1}, y_0, y_1, y_2,$ and $y_3$ departures from Dallas, the $x_{-2}$ departure to Dallas can hook-up with any one of the $y_{-3}, y_{-2}, y_{-1}, y_0, y_1, y_2,$ and $y_3$ departures from Dallas, and so forth, although some of the hook-ups from Dallas may be excluded by minimum turnaround constraints (e.g., the $y_{-3}$ departure from Dallas may depart too soon after the $x_{-2}$ flight arrives in Dallas) or maximum turnaround constraints (e.g., the $y_3$ departure from Dallas may depart too long after the $x_{-3}$ flight arrives in Dallas).

As shown in FIG. 10, a sample of the large number of candidate routes is selected (step 1015). For example, the sample may include candidate routes corresponding to five to ten of the routes in the seed schedule (e.g., one of which is the route that includes the Austin to Dallas to Amarillo flights of FIG. 11). Such a sample results in roughly ten thousand candidate routes (i.e., with each candidate route corresponding to a different combination of original and/or alternative departure times), although the number may vary widely (e.g., as few as 4000 to as many as 100,000). The candidate routes are not necessarily limited to a union of the candidate routes corresponding to each of the five to ten routes in the seed schedule. Additional candidate routes can be generated by exchanging hook-ups between candidate routes. If two routes have hook-ups at the same station at approximately the same time, it may be possible to exchange the hook-ups. For example, as shown in FIG. 11, a flight 1115 from New Orleans to Dallas with an $a_0$ departure time may hook-up with a Dallas to Albuquerque flight 1120 with a $b_0$ departure time. Additional candidate routes can be generated by having the Austin to Dallas flight 1105 hook-up with the Dallas to Albuquerque flight 1150 (e.g., having an $a_{-2}$ departure hook-up with the $y_2$ departure) and having the New Orleans to Dallas flight 1115 hook-up with the Dallas to Amarillo flight 1110 (e.g., having the $x_2$ departure hook-up with a $b_{-2}$ departure).

The purpose of selecting a sample of candidate routes at step 1015 is to limit the number of possibilities and to identify specific routes from the candidate routes that produce improvements in the overall schedule. Instead of selecting the sample entirely randomly, a weighted, pseudo-random selection process is used to favor a selection of (1) routes that are problematic and/or (2) routes that can potentially interact with one another (e.g., by including departures from the same station at approximately the same time) and for which changes to the routes have the potential to improve the overall schedule (i.e., in terms of meeting demand and/or conforming to the constraints).

Weighting for the pseudo-random selection process is performed by scoring routes in the seed schedule (i.e., before expansion). The scoring can be based on an objective function to determine which routes are problematic or can be improved based on, for example, turnaround times (e.g., too long or too short), demand curves, gate contentions, and flights that are too close or too far from the next or the preceding flight for the same market pair. In addition, it is possible to dynamically weight routes such that once a particular route is selected for the sample, the remaining route weightings are adjusted to favor selecting routes that are likely to interact with the particular route. The pseudo-random selection process is then performed on the weighted routes. As an alternative to expanding all of the routes in the seed schedule and then performing sampling, it is also possible to sample from the seed schedule and then expand only the sampled routes.

The sample of candidate routes is stored (step 1020), and a determination is made as to whether another sampling iteration should be performed (step 1025). This determination can be made, for example, by determining whether a predetermined number of iterations have been performed, whether a preselected time has elapsed, or whether a predetermined number of candidate routes has been stored. In this manner, sampling of candidate routes is repeated multiple times, with the resulting set of sampled candidate routes in each iteration appended to the previously stored candidate routes to produce a total number of candidate routes that increases with each iteration. The accumulated overall sample of candidate routes are analyzed to identify duplicate routes, and any duplicate routes are removed (step 1030), which can significantly reduce the overall sample size (e.g., from several million down to several hundred thousand). Duplicate routes can also be removed prior to storing the results of each iteration.

The resulting sample of candidate routes is then analyzed using linear programming to produce a score for each possible route (step 1035). In general, an objective function is defined that places values on different schedule characteristics. Some values may be positive while others may be negative. In addition, each characteristic can be given a different weight. For example, the objective function can measure factors that affect how well the schedule meets demand. Schedule characteristics that tend to increase demand are given a positive value, while those that tend to decrease demand are given a negative value. In addition, schedule characteristics that tend to have a greater impact on demand are weighted more heavily than characteristics that tend to have a lesser impact.

A composite score for each possible schedule is calculated (step 1040). Each possible schedule includes a different combination of candidate routes. Some routes are mutually exclusive (e.g., routes that include one or more of the same flights) and thus cannot be part of the same possible schedule. As a result, each different combination of candidate routes that does not include any conflicting routes is a different possible schedule. To produce the composite score for each possible schedule, the candidate routes and/or their corresponding score are inserted in a matrix, and mathematical programming is used to process the matrix to produce the composite score (e.g., by adding the scores of the candidate routes).

The matrix is processed using files that contain operational and marketing constraints and files that define demand curves. In addition, scoring files that define how to score combinations of candidate routes based on the constraints and demand curves are used. In general, the scoring files are defined by a user in accordance with an assessment of the relative importance and/or undesirability of various schedule characteristics. The constraint files are used to preclude certain schedule characteristics and/or for generating penalty values for schedule characteristics that violate certain constraints (e.g., required overnights, gate availability, etc.). The demand curves are used to generate values representing nonstop demand and one-stop demand (and possibly higher order demand values) as well as demand that results from connecting flights. The penalty values and demand values are based on scoring algorithms defined in the scoring files. The values are combined to produce the composite score. In some cases, the values are weighted in accordance with a predefined weighting scheme, as defined in the scoring files.

The scoring files are generally based, at least in part, on historical data. Demand curves can be based on linear interpolations of historical departure times and passenger counts by market (and/or market size) and time of day. Demand curves can also be modified to account for estimated growth and/or increased competition.

In calculating the composite score, the values are combined in accordance with an objective function that adds nonstop demand and one-stop demand values and subtracts values for proximity loss, violations of constraints, and other penalties. Proximity loss relates to a reduction in demand resulting from the proximity of nonstop flights to one-stop flights for the same markets. Proximity loss also relates to reduction in demand due to the effects of the market spacing constraints of gap and compression. "Gap" refers to a time differential between flights for the same market pair that tends to cause a reduction in demand because the flights are too far apart. "Compression" is a time differential between flights for the same market pair that tends to cause a reduction in demand because the flights are too close together. Penalties can include, for example, penalties for schedule characteristics that contribute to proximity loss, turnaround times below an absolute minimum threshold or below a minimum threshold by flight time or by number of passengers boarding or de-boarding, turnaround times that exceed a maximum threshold by station size, flight time, or number of passengers boarding or de-boarding.

Penalties can also relate to violations of operational constraints. For example, penalties can be incurred for exceeding the number of available aircraft, violating balancing constraints, too many or too few aircraft remaining overnight at particular stations, violations of positioning constraints, violations of maintenance requirements, absences of desired blocks of ground time, and exceeding available gate constraints.

Once a composite score is generated for each possible schedule, the various composite scores are compared to identify a schedule that corresponds to the highest composite score (step 1045). The schedule with the highest composite score is selected as a replacement for the seed schedule.

Multiple iterations of mathematical programming processing can be performed to incrementally improve the schedule, with each iteration using the replacement schedule from the previous iteration as the new seed schedule. The constraint programming techniques alone or in combination with the mathematical programming techniques can be used to predict the effect of changes in parameters, such as reducing the number of planes, adding flights and/or aircraft, increasing the number of gates at a station, and the like.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 12:
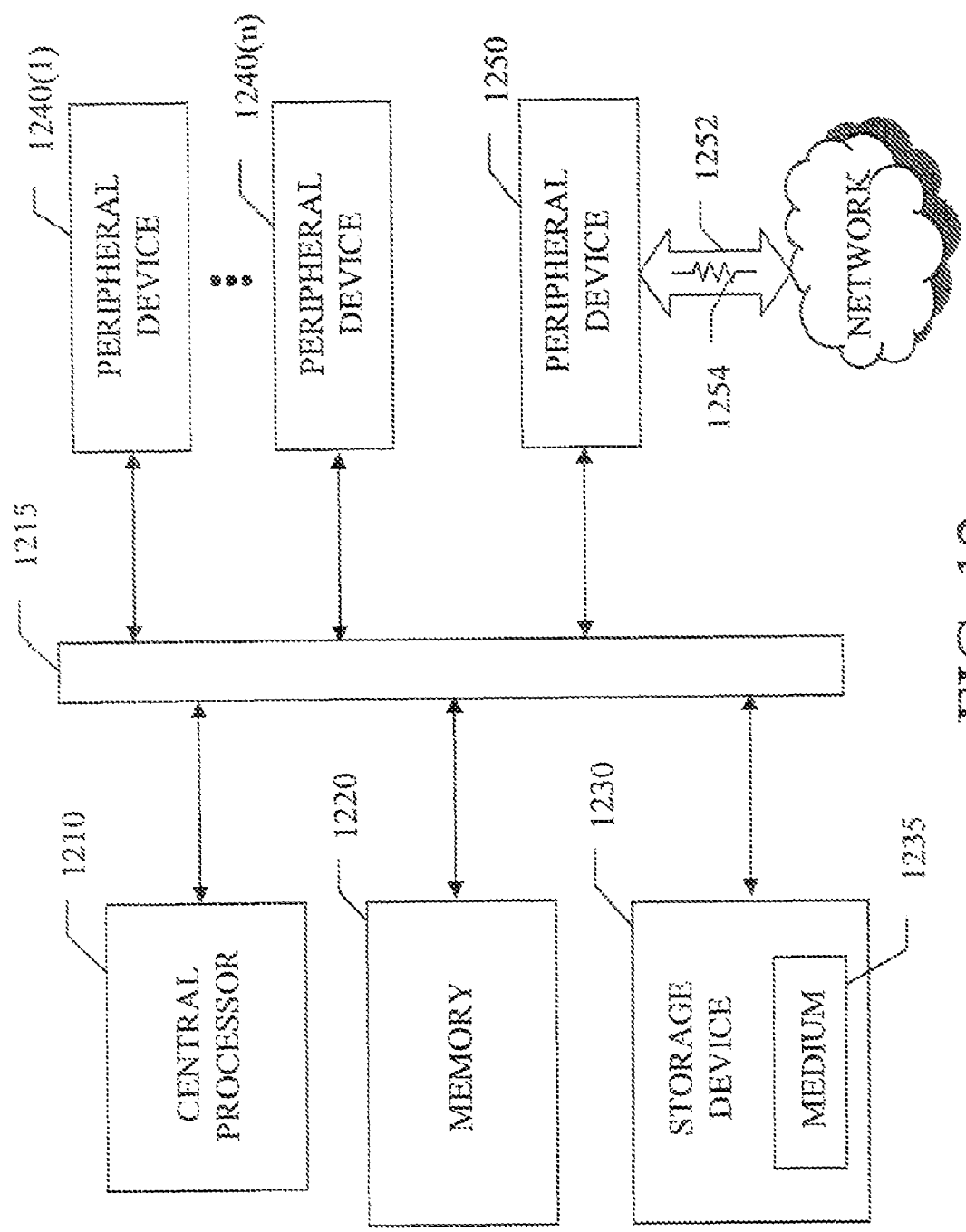
FIG. 12 is a block diagram illustrating an example data processing system in which a constraint programming module and/or a mathematical programming module can be implemented.

FIG. 12 is a block diagram illustrating an example data processing system 1200 in which a constraint programming module and/or a mathematical programming module can be implemented. The data processing system 1200 includes a central processor 1210, which executes programs, performs data manipulations, and controls tasks in the system 1200. The central processor 1210 is coupled with a bus 1215 that can include multiple busses, which may be parallel and/or serial busses.

The data processing system 1200 includes a memory 1220, which can be volatile and/or non-volatile memory, and is coupled with the communications bus 1215. The system 1200 can also include one or more cache memories. The data processing system 1200 can include a storage device 1230 for accessing a storage medium 1235, which may be removable, read-only, or read/write media and may be magnetic-based, optical-based, semiconductor-based media, or a combination of these. The data processing system 1200 can also include one or more peripheral devices 1240(1)-1240(n) (collectively, devices 1240), and one or more controllers and/or adapters for providing interface functions.

The system 1200 can further include a communication interface 1250, which allows software and data to be transferred, in the form of signals 1254 over a channel 1252, between the system 1200 and external devices, networks, or information sources. The signals 1254 can embody instructions for causing the system 1200 to perform operations. The system 1200 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 1200 and/or delivered to the machine 1200 over a communication interface. These instructions, when executed, enable the machine 1200 to perform the features and function described above. These instructions represent controllers of the machine 1200 and can be implemented in a high-level procedural and/or object-oriented programming language, and/or in assembly/machine language. Such languages can be compiled and/or interpreted languages.

A number of implementations have been described. Nevertheless, it will be understood that various modifications may be made. For example, the sequence of steps in the processes described in reference to FIGS. 1, 2, 6-8, and 10 can be performed in a different order and/or some steps can be performed in parallel. In addition, the described techniques can be used for scheduling any type of transportation resources and constraints can be tailored to the type of scheduling problem and/or according to preferences of a user or entity implementing the techniques. Accordingly, other implementations are within the scope of the following claims.

What is claimed is:

1. A computer-implemented method for iteratively refining a seed schedule for a network of transportation resources, the method comprising:

identifying a first seed schedule including a plurality of segments, with each segment connecting two markets and having at least one of a corresponding departure time or a corresponding arrival time, the first seed schedule further including paths to be traversed by a particular transportation resource, each path including a plurality of sequentially connected segments;

defining at least one of additional candidate departure windows or additional candidate arrival windows for at least one segment in the first seed schedule;

generating additional candidate paths with the computer from a set of available segments, each additional candidate path including a different plurality of sequentially connected segments than the paths in the first seed schedule, wherein the set of available segments includes at least a portion of the segments in the first seed schedule and at least a portion of the segments having at least one of additional candidate departure windows or arrival windows;

using the computer to generate a composite score using mathematical programming for the first seed schedule and at least one possible alternative schedule, wherein the at least one possible alternative schedule includes a different combination of candidate paths than the first seed schedule; and identifying a replacement schedule with the computer by comparing the composite scores for the at least one possible alternative schedule and the first seed schedule.

2. The method of claim 1, wherein the composite score is generated based on at least a demand curve.

3. The method of claim 1, wherein the composite score is generated using an objective function defining a relative desirability of at least one particular combination of candidate paths.

4. The method of claim 3, wherein the composite score is determined based at least in part on a proximity loss of the at least one possible alternative schedule, wherein the proximity loss is an estimate of a reduction in demand resulting from proximity of nonstop flights to one-stop flights for particular market pairs.

5. The method of claim 1 further comprising using the replacement schedule as a second seed schedule in a second iteration of refining the first seed schedule if the replacement schedule is different from the first seed schedule.

6. The method of claim 1 wherein the first seed schedule is generated using constraint programming.

7. The method of claim 1 further comprising selecting one of the first seed schedule or the replacement schedule as a final schedule for fleet assignment.

8. The method of claim 1, further comprising selecting a final schedule for fleet assignment after a number of iterations of refining the first seed schedule, after a predefined time, or after a desired level of efficiency or revenue is reached.

9. The method of claim 1, wherein each segment is associated with at least one of a particular departure time or a particular arrival time of a particular transportation resource traveling from a particular origination market to a particular destination market.

10. The method of claim 1, wherein at least one additional candidate path including a different plurality of sequentially connected segments corresponds to a path in the first seed schedule, the at least one additional candidate path traversing the same sequence of markets as the corresponding path in the first seed schedule but including at least one segment with a different departure or arrival window as a corresponding segment in the corresponding path.

11. An article comprising a non-transitory, machine-readable medium storing instructions for refining a seed schedule for a network of transportation resources, the instructions causing data processing apparatus to perform operations comprising:

identifying a first seed schedule including a plurality of segments, with each segment connecting two markets and having at least one of a corresponding departure time or a corresponding arrival time, the first seed schedule further including paths to be traversed by a particular transportation resource, each path including a plurality of sequentially connected segments;

defining at least one of additional candidate departure windows or additional candidate arrival windows for at least one segment in the first seed schedule;

generating additional candidate paths from a set of available segments, each additional candidate path including a different plurality of sequentially connected segments than the paths in the first seed schedule, wherein the set of available segments includes at least a portion of the segments in the first seed schedule and at least a portion of the segments having at least one of additional candidate departure windows or arrival windows;

generating a composite score using mathematical programming for the first seed schedule and at least one possible alternative schedule, wherein the at least one possible alternative schedule includes a different combination of candidate paths than the first seed schedule; and identifying a replacement schedule by comparing the composite scores for the at least one possible alternative schedule and the first seed schedule.

12. The article of claim 11, wherein the composite score is generated based on at least a demand curve.

13. The article of claim 11, wherein the composite score is generated using an objective function defining a measure of efficiency of at least one of meeting demand, estimated revenue, estimated costs, or estimated resource utilization.

14. The article of claim 13, wherein the composite score is determined based at least in part on a proximity loss of the at least one possible alternative schedule, wherein the proximity loss is an estimate of a reduction in demand resulting from proximity of nonstop flights to one-stop flights for particular market pairs.

15. The article of claim 11 wherein the operations further comprise using the replacement schedule as a second seed schedule in a second iteration of refining the first seed schedule if the replacement schedule is different from the first seed schedule.

16. A system for refining a seed schedule for a network of transportation resources, the system comprising:

memory operable to store information associated with a first seed schedule and possible alternative schedules; and one or more processors operable to:

identify a first seed schedule including a plurality of segments, with each segment connecting two markets and having at least one of a corresponding departure time or a corresponding arrival time, the first seed schedule further including paths to be traversed by a particular transportation resource, each path including a plurality of sequentially connected segments;

define at least one of additional candidate departure windows or additional candidate arrival windows for at least one segment in the first seed schedule;

generate additional candidate paths from a set of available segments, each additional candidate path including a different plurality of sequentially connected segments than the paths in the first seed schedule, wherein the set of available segments includes at least a portion of the segments in the first seed schedule and at least a portion of the segments having at least one of additional candidate departure windows or arrival windows;

generate a composite score using mathematical programming for the first seed schedule and at least one possible alternative schedule, wherein the at least one possible alternative schedule includes a different combination of candidate paths than the first seed schedule; and identify a replacement schedule by comparing the composite scores for the at least one possible alternative schedule and the first seed schedule.

17. The system of claim 16, wherein the composite score is generated using an objective function defining a relative desirability of at least one particular combination of candidate paths.

18. The system of claim 16, wherein the one or more processors are further operable to use the replacement schedule as a second seed schedule in a second iteration of refining the first seed schedule if the replacement schedule is different from the first seed schedule.

* * * * *